(12) United States Patent
Aragaki et al.

(10) Patent No.: US 8,396,291 B2
(45) Date of Patent: Mar. 12, 2013

(54) COMPONENT EXTRACTION/CORRECTION DEVICE, COMPONENT EXTRACTION/CORRECTION METHOD, STORAGE MEDIUM AND ELECTRONIC EQUIPMENT

(75) Inventors: Hideya Aragaki, Hino (JP); Takahiro Saito, Yokohama (JP)

(73) Assignees: Olympus Corporation, Tokyo (JP); Kanagawa University, Yokohama-shi (JP)

( * ) Notice: Subject to any disclaimer, the term of this patent is extended or adjusted under 35 U.S.C. 154(b) by 760 days.

(21) Appl. No.: 12/510,568

(22) Filed: Jul. 28, 2009

(65) Prior Publication Data

US 2010/0027885 A1    Feb. 4, 2010

(30) Foreign Application Priority Data

Jul. 30, 2008 (JP) ................... 2008-196814

(51) Int. Cl.
*G06K 9/00* (2006.01)
(52) U.S. Cl. ........................ 382/167; 382/276
(58) Field of Classification Search .................. 382/162, 382/164, 167, 240, 260, 275, 276
See application file for complete search history.

(56) References Cited

U.S. PATENT DOCUMENTS

| | | | |
|---|---|---|---|
| 5,526,446 A * | 6/1996 | Adelson et al. | 382/275 |
| 2004/0252907 A1 * | 12/2004 | Ito | 382/260 |
| 2008/0199100 A1 | 8/2008 | Ishiga | |
| 2009/0040386 A1 | 2/2009 | Ishiga | |
| 2009/0060323 A1 * | 3/2009 | Aragaki et al. | 382/164 |

FOREIGN PATENT DOCUMENTS

JP    2006-309749 A    11/2006

OTHER PUBLICATIONS

Jean-Francois Aujol et al; Structure-Texture Image Decomposition—Modeling, Algorithms, and Parameter Selection; International Journal of Computer Vision 67 (1); 2006.
H. Aizawa et al; Removal of Signal-Dependent Noise through the TV-LI Nonlinear Image Decomposition; vol. J91-D, No. 8, pp. 1998-2001; 2008.
Japanese Office Action dated Apr. 24, 2012 (and English translation thereof) in counterpart Japanese Application No. 2008-196814.

* cited by examiner

*Primary Examiner* — Duy M Dang
(74) *Attorney, Agent, or Firm* — Holtz, Holtz, Goodman & Chick, PC

(57) ABSTRACT

Provided is a component extraction/correction device, comprising: a decomposition unit that decomposes an original image signal into a plurality of frequency bands to generate a plurality of band signals; an extraction unit that extracts a skeleton component from among a plurality of components constituting the band signal; a first correction unit that corrects the extracted skeleton component by using the band signal and one component other than the skeleton component among the plurality of components; and a second correction unit that corrects the one component by using the corrected skeleton component and the band signal.

28 Claims, 15 Drawing Sheets

COMPONENT EXTRACTION/CORRECTION DEVICE, COMPONENT EXTRACTION/CORRECTION METHOD, STORAGE MEDIUM AND ELECTRONIC EQUIPMENT

FIELD OF THE INVENTION

This invention relates to a component extraction/correction device for extracting a component from an image signal and correcting the component, a component extraction/correction method, a storage medium storing a component extraction/correction program, and an electronic equipment to which the component extraction/correction device is mounted.

BACKGROUND OF THE INVENTION

Up to now, a method of decomposing the original image signal F into a skeleton component (geometrical image structure) and a component other than the skeleton component and extracting the components, is disclosed in the following document: Jean-Francois Aujol, Guy Gilboa, Tony Chan & Stanley Osher, "*Structure-Texture Image Decomposition—Modeling, Algorithms, and Parameter Selection*", *International Journal of Computer Vision*, Volume 67, Issue 1, (April 2006) Pages: 111-136, Year of Publication: 2006. The skeleton component is a component representing a global structure, and includes a flat component (component that varies gently) and an edge component. The component other than the skeleton component is a component representing a local structure, and includes a detailed structural component such as a texture, and a noise.

As a method of decomposing an image, there are addition type separation and multiplication type separation. In the addition type separation, the original image signal F is expressed as the sum of a first component U and a second component V as illustrated in Equation (1).

$$F = U + V \qquad (1)$$

The first component U is a skeleton component. The second component V other than the skeleton component includes a texture component and a noise, and is defined as a remainder component obtained by subtracting the first component U from the original image signal F.

Herein, a decomposition method employing a bounded variation function and a norm is used. An Aujol-Aubert-Blanc-Feraud-Chambolle model (A2BC variation model) described in "*Structure-Texture Image Decomposition—Modeling, Algorithms, and Parameter Selection*" is used for decomposition. A property of the first component U determined as an optimal solution is modeled as a bounded variation function space (BV) constituted by a plurality of "smooth luminance variation small part regions" compartmentalized by discrete boundaries. The energy of the first component U is defined as a total variation energy by a total-variation (TV) norm J(U) illustrated in Equation (2).

$$J(U) = \int \|\Delta U\| dx dy \qquad (2)$$

In Equation (2), x represents a pixel position in a horizontal direction of the first component U, and y represents a pixel position in a vertical direction thereof.

Meanwhile, a function space of the second component V in Equation (1) is modeled as an oscillation function space G. The oscillation function space G is a function space expressed by oscillation generating functions g1 and g2 as illustrated in Equation (3), and the energy thereof is defined as G norm $\|V\|_G$ in Equation (4).

$$V_{(x,y)} = \partial_x g_{1(x,y)} + \partial_x g_{2(x,y)}; g_1, g_2 \in L_\infty(R^2) \qquad (3)$$

$$\|V\|_G = \inf_{g1,g2} \{\|(g_1)^2 + (g_2)^2\|_{L_\infty}; V = \partial_x g_1 + \partial_x g_2\} \qquad (4)$$

A decomposition problem of the original image signal F is formulated as a variation problem of Equation (5) for minimizing an energy functional. The variation problem can be solved by the projection method of Chambolle.

$$\inf_{U,V \in G_\mu} \left\{ J(U) + \frac{1}{2\alpha} \|F - U - V\|_{L^2}^2 \right\} \qquad (5)$$

$$\alpha > 0, \mu > 0, G_\mu = \{V \in G \mid \|V\|_G \leq \mu\}$$

The second component V separated from the original image signal F receives a noise effect. However, the first component U receives substantially no noise effect, and hence the skeleton component (geometrical image structure) is extracted without blunting an edge.

In the multiplication type separation, the original image signal F is expressed by the product of the first component U and the second component V as illustrated in Equation (6). However, when a logarithmic original image signal obtained by logarithmically transforming the original image signal F is set as f, the multiplication type separation can be transformed into an addition type separation problem as illustrated in Equation (7).

$$F = U * V \qquad (6)$$

$$f = u + v \ (f = \log F, u = \log U, v = \log V) \qquad (7)$$

SUMMARY OF THE INVENTION

A component extraction/correction, device according to one aspect of this invention comprises: a decomposition unit that decomposes an original image signal into a plurality of frequency bands to generate a plurality of band signals; an extraction unit that extracts a skeleton component representing a global structure of the band signal from among a plurality of components constituting the band signal; a first correction unit that performs a first correction processing to correct the extracted skeleton component by using the band signal and one component other than the skeleton component among the plurality of components; and a second correction unit that performs a second correction processing to correct the one component by using the corrected skeleton component and the band signal.

A component extraction/correction method according to another aspect of this invention comprises: a decomposition step of decomposing an original image signal into a plurality of frequency bands to generate a plurality of band signals; an extraction step of extracting a skeleton component representing a global structure of the band signal from among a plurality of components constituting the band signal; a first correction step of performing a first correction processing to correct the extracted skeleton component by using the band signal and one component other than the skeleton component among the plurality of components; and a second correction step of performing a second correction processing to correct the one component by using the corrected skeleton component and the band signal.

A computer-readable storage medium according to still another aspect of this invention stores a program that is executed by a computer, and the program comprises: a decomposition step of decomposing at original image signal into a plurality of frequency bands to generate a plurality of band signals; an extraction step of extracting a skeleton component representing a global structure of the band signal from among a plurality of components constituting the band signal; a first correction step of performing a first correction processing to correct the extracted skeleton component by using the band signal and one component other than the skeleton component among the plurality of components; and a second correction step of performing a second correction processing to correct the one component by using the corrected skeleton component and the band signal.

DETAILED DESCRIPTION OF THE PREFERRED EMBODIMENTS

First Embodiment

Figure 1:
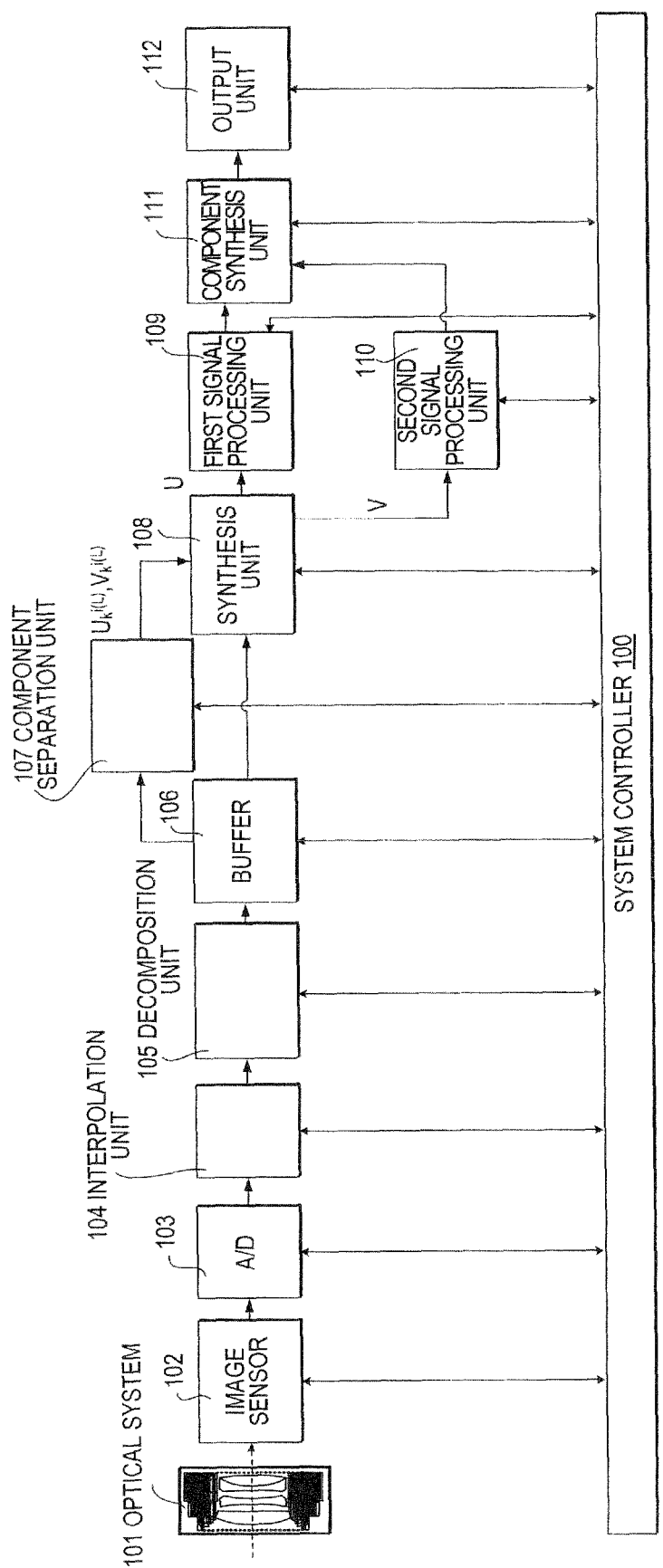
FIG. 1 is a schematic configuration diagram of an imaging electronic equipment equipped with a component extraction/correction device according to a first embodiment.

By referring to FIG. 1, description is made of a component extraction/correction device according to a first embodiment of this invention. It should be noted that the first embodiment is described by assuming that the component extraction/correction device is mounted to an imaging apparatus (or imaging electronic equipment) such as a digital camera or a digital video camera. However, this invention is not limited thereto and can be applied to any other kind of imaging apparatus.

The imaging apparatus includes a system controller 100 (control unit), an optical system 101, an image sensor 102, an A/D converter 103 (hereinafter, referred to simply as "A/D"), an interpolation unit 104, and a multi-resolution decomposition unit 105 (hereinafter, may be referred to simply as "decomposition unit"). The imaging apparatus further includes a buffer 106, a component separation unit 107, a multi-resolution synthesis unit 108 (hereinafter, may be referred to simply as "synthesis unit"), a first signal processing unit 109, a second signal processing unit 110, a component synthesis unit 111, and an output unit 112. Each of the above-mentioned components may be configured by a logic circuit, or may be configured by a central processing unit (CPU) and a memory or the like storing a computing program. The component extraction/correction device of this embodiment includes the multi-resolution decomposition unit 105 and the component separation unit 107.

In the imaging apparatus according to this embodiment, an original image signal F is separated into components to generate a first component U and a second component V. Herein, the first component U is a skeleton component (geometrical image structure) of the original image signal including a flat component (component that varies gently) and an edge component. The second component V is a component other than the skeleton component, and represents a remainder component obtained by subtracting the first component U from the original image signal. After the component separation, the separated components are each subjected to an optimum processing, and are synthesized.

Figure 13A:
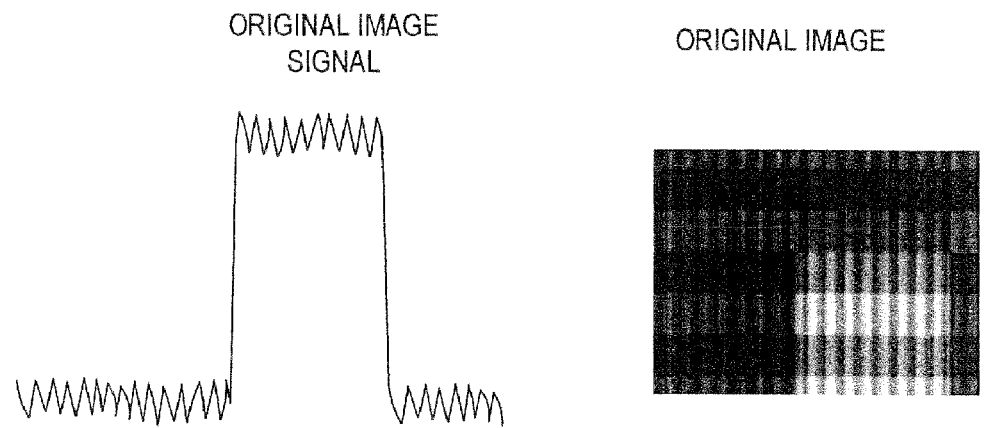
FIG. 13A illustrates an example of an original image signal and an example of an original image.
Figure 13B:
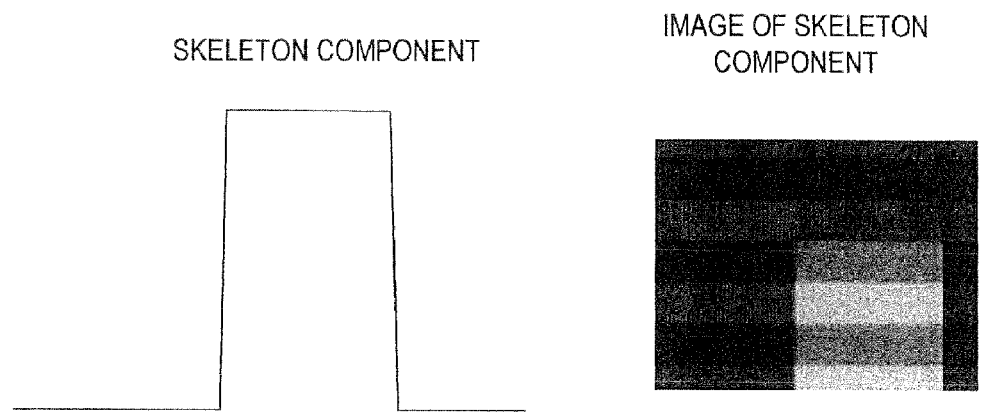
FIG. 13B illustrates an example of a skeleton component and an example of an image corresponding to the skeleton component.
Figure 13C:
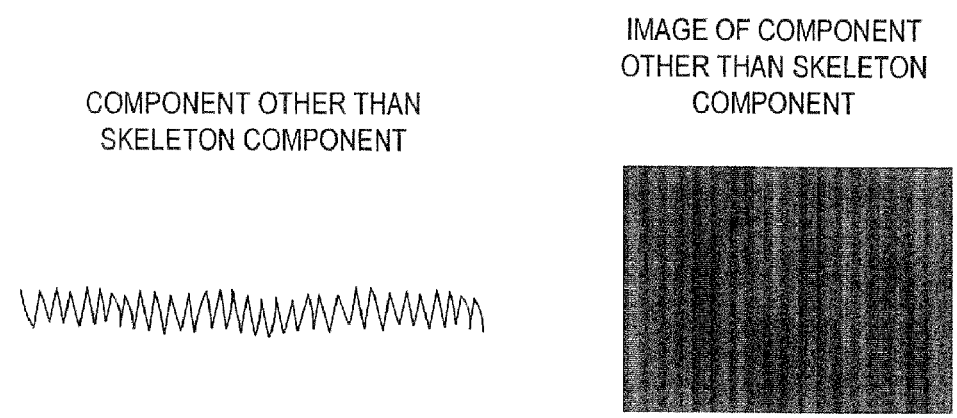
FIG. 13C illustrates an example of a component other than the skeleton component and an example of an image corresponding to the component.

FIG. 13A illustrates an example of a line profile of the original image signal F and an example of an original image. FIG. 13B illustrates an example of a line profile of the skeleton component and an example of an image corresponding to the skeleton component. FIG. 13C illustrates an example of a line profile of the component other than the skeleton component and an example of an image corresponding to the component. As illustrated in FIG. 13B, the skeleton component (first component U) is a component representing a global structure. The global structure represents an outline portion of features of a signal, and is constituted by edge components and a flat component (component that varies gently) that is a smooth-luminance-variation region compartmentalized by the edge components. As illustrated in FIG. 13C, the component (second component V) other than the skeleton component is a component representing a local structure. The local structure represents a detailed portion of the features of the signal, and the second component V includes a detailed structural component (or oscillating component) such as a texture, and a noise.

As a method for the component separation, there are an addition type separation and a multiplication type separation. In the addition type separation, the original image signal F is expressed as the sum of the first component U and the second component V as illustrated in Equation (1) described above (F=U+V).

In the multiplication type separation, the original image signal F is expressed by the product of the first component U and the second component V as illustrated in Equation (6) described above (F=U*V). However, when the original image signal F is logarithmically transformed into a logarithmic original image signal f, the multiplication type separation can be transformed into an addition type separation problem as illustrated in Equation (7) described above.

In this embodiment, the description is made with regard to the addition type separation, and detailed description of the multiplication type separation is omitted. It should be noted that in a case of the multiplication type separation, a signal value obtained by logarithmically transforming the original image signal on a pixel basis is subjected to a processing similar to that for the addition type separation to achieve the component separation. After that, if an inverse logarithmic transform is performed for each of the separated components, a multiplication type separation processing illustrated in Equation (6) can be realized.

The image sensor 102 is connected to the interpolation unit 104 via the A/D 103. The interpolation unit 104 is connected to the decomposition unit 105. The decomposition unit 105 is connected to the component separation unit 107 and the synthesis unit 108 via the buffer (buffer memory) 106. The component separation unit 107 is connected to the synthesis unit 108. The synthesis unit 108 is connected to the first signal processing unit 109, and also connected to the component synthesis unit 111 via the second signal processing unit 110. The component synthesis unit 111 is connected to the output unit 112. Each of the processing units is connected to the system controller 100, and has an operation thereof controlled by the system controller 10.

On the basis of the control of the system controller 100, the image sensor 102 outputs an optical image formed on a surface of the image sensor 102 via the optical system 101 as an analog image signal. It should be noted that in this embodiment, the image sensor 102 is a color image sensor having a front surface on which a color filter array is disposed. The image sensor 102 may be of any one of a single plate type and a multi-plate type.

The analog image signal is transferred to the A/D 103. The A/D 103 converts the analog image signal into a digital signal, which is then transferred to the interpolation unit 104.

The interpolation unit 104 subjects the digital signal to a predetermined demosaicing processing to generate a color three-plate image signal (hereinafter, referred to as "original image signal F"). In this embodiment, the original image signal F is constituted by color signals of red (R), green (G), and blue (B). Hereinafter, the color signals of red (R), green (G), and blue (B) are referred to as Fr, Fg, and Fb, respectively. The original image signal F is transferred to the decomposition unit 105 (multi-resolution decomposition unit).

The decomposition unit 105 subjects each of the color signals Fr, Fg, Fb to multi-resolution decomposition of a predetermined stage number I (where I represents an integer equal to or larger than 1), and decomposes each of the color signals into a plurality of frequency bands to generate a plurality of band signals. The decomposition unit 105 generates a high-frequency component and a low-frequency component for each of i stages of the decomposition (where i represents an integer equal to or larger than 1 and equal to or smaller than I), and records the high-frequency component and the low-frequency component into the buffer 106. It should be noted that details of the multi-resolution decomposition are described later.

In this embodiment, an orthogonal wavelet transform using a Haar basis is performed for the multi-resolution decomposition. However, all of wavelet bases including a biorthogonal wavelet basis can be applied. Further, it is possible to apply a redundant wavelet transform (such as a stationary wavelet transform) of a type that avoids subsampling (so that the number of wavelet coefficients at each level becomes the same as the number of input pixels).

The component separation unit 107 decomposes each high-frequency component into a first component and a second component that are included in the high-frequency component. Herein, the first component corresponds to a skeleton component of the original image signal including a flat component and an edge component. The second component corresponds to a remainder component obtained by subtracting the first component from the original image signal, which includes a detailed structural component such as a texture, and a noise.

The component separation unit 107 repeatedly subjects the high-frequency component to a processing that combines two different noise reduction processings (multi-stage processing and single-stage coring processing (soft thresholding)) with a difference calculation processing. More repetitions improve decomposition precision for the first component and the second component. The first component and the second component that have been subjected to a predetermined number of processing repetitions are transferred to the synthesis unit 108. It should be noted that details of the component decomposition, the multi-stage coring processing, and the single-stage coring processing (soft thresholding) are described later.

Herein, the single-stage coring processing is typically performed such that every output signal value is set to zero if an input signal falls within a coring range, while a signal value obtained by subtracting/adding a threshold value from/to the input signal is set as the output signal value if the input signal falls outside the coring range. The coring range is a range defined by a lower-limit threshold value and an upper-limit threshold value. Further, the multi-stage coring processing is different from a general single-stage coring processing. In the multi-stage coring processing, the input signal is transformed into a predetermined value based on a transformed function specified by a plurality of coring ranges. Each of the coring ranges has the lower-limit threshold value, the upper-limit threshold value, and an output value corresponding to each of the coring ranges.

The synthesis unit 108 (multi-resolution synthesis unit) acquires the low-frequency component from the buffer 106, and acquires the first component and the second component that are included in the high-frequency component from the component separation unit 107. Here, based on the low-frequency component and the first component included in the high-frequency component, the synthesis unit 108 generates the first component U of the original image signal F. In a similar manner, based on the second component included in the high-frequency component, the synthesis unit 108 generates the second component V of the original image signal F. The generated first component U and the generated second component V are transferred to the first signal processing unit 109 and the second signal processing unit 110, respectively. It should be noted that details of a multi-resolution synthesis processing are described later.

The first signal processing unit 109 reads the first component U of the original image signal F from the synthesis unit 108, and performs a predetermined signal processing. In this embodiment, the first signal processing unit 109 performs a gradation conversion on the first component U of the original image signal F. A first component U' after being subjected to the gradation conversion is transferred to the component synthesis unit 111. For example, with regard to the first component U, the first signal processing unit 109 calculates a histogram based on a signal level, and sets a gradation conversion curve based on the histogram. The first signal processing unit 109 acquires a gradation conversion coefficient related to each pixel from the gradation conversion curve, and multiplies the first component U by the gradation conversion coefficient. Thus, the first component U' after being subjected to the gradation conversion can be obtained. The first signal processing unit 109 may perform another gradation conversion such as a γ correction.

The second signal processing unit 110 reads the second component V from the synthesis unit 108, and performs a predetermined signal processing. In this embodiment, the second signal processing unit 110 performs on the second component V a noise reduction processing and a sharpening processing based on gain multiplication. A second component V' after being processed is transferred to the component synthesis unit 111. Examples of the noise reduction processing to be performed include the coring processing and a filtering processing.

The component synthesis unit 111 synthesizes the first component U' that has been processed by the first signal processing unit 109 and the second component V' that has been processed by the second signal processing unit 110 at a predetermined ratio, and a synthesis component F' is obtained. The predetermined ratio is a ratio of, for example, 1:1. The synthesis component F' is transferred to the output unit 112, and is recorded into a recording medium constituted by a flash memory or the like.

(Multi-Resolution Decomposition Unit 105)

Figure 2:
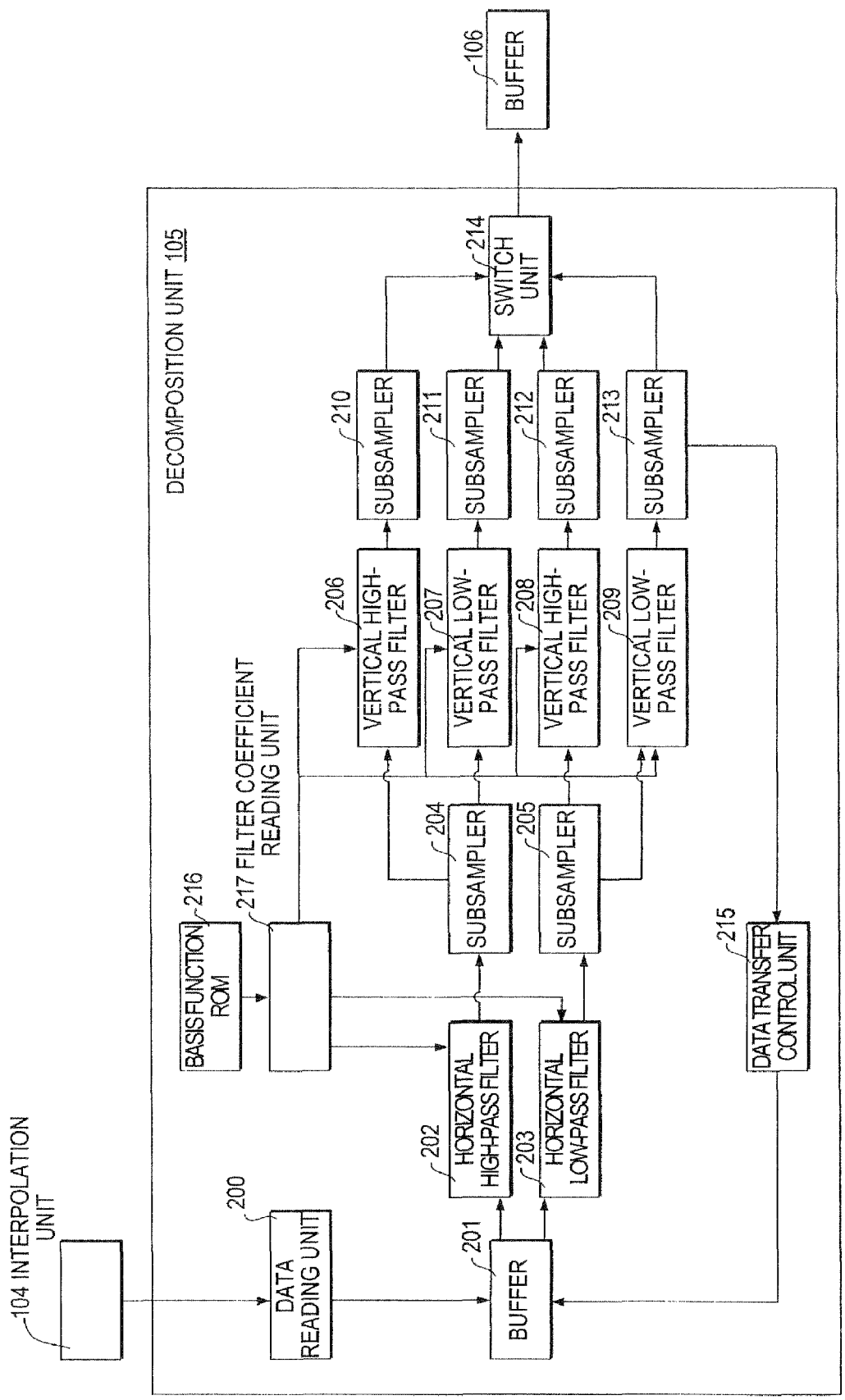
FIG. 2 is a schematic configuration diagram of a multi-resolution decomposition unit according to the first embodiment.

Next, FIG. 2 is referenced to describe a configuration of the multi-resolution decomposition unit 105. The decomposition unit 105 generates a plurality of band signals by decomposing each of the color signals Fr, Fg, and Fb into a plurality of frequency bands.

The decomposition unit 105 includes a data reading unit 200, a buffer (buffer memory) 201, a horizontal high-pass filter 202, a horizontal low-pass filter 203, and subsamplers 204 and 205. Further, the decomposition unit 105 includes a vertical high-pass filter 206, a vertical low-pass filter 207, a vertical high-pass filter 208, and a vertical low-pass filter 209. In addition, the decomposition unit 105 includes subsamplers 210, 211, 212, and 213, a switch unit 214, a data transfer control unit 215, a basis function ROM 216, and a filter coefficient reading unit 217.

The interpolation unit 104 is connected to the buffer 201 via the data reading unit 200. The buffer 201 is connected to the horizontal high-pass filter 202 and the horizontal low-pass filter 203. The horizontal high-pass filter 202 is connected to the vertical high-pass filter 206 and the vertical low-pass filter 207 via the subsampler 204. The horizontal low-pass filter 203 is connected to the vertical high-pass filter 208 and the vertical low-pass filter 209 via the subsampler 205.

The vertical high-pass filter 206 and the vertical low-pass filter 207 are connected to the subsampler 210 and the subsampler 211, respectively. The vertical high-pass filter 208 and the vertical low-pass filter 209 are connected to the subsampler 212 and the subsampler 213, respectively. The subsamplers 210, 211, 212, and 213 are each connected to the switch unit 214. The subsampler 213 is also connected to the data transfer control unit 215.

The switch unit 214 is connected to the buffer 106. The data transfer control unit 215 is connected to the buffer 201. The basis function ROM 216 is connected to the filter coefficient reading unit 217. The filter coefficient reading unit 217 is connected to each of the horizontal high-pass filter 202, the horizontal low-pass filter 203, the vertical high-pass filter 206, the vertical low-pass filter 207, the vertical high-pass filter 208, and the vertical low-pass filter 209.

A filter coefficient used for a wavelet transform based on a Haar function, a Daubechies function, or the like is recorded in the basis function ROM 216. Of those, for example, a high-pass filter coefficient and a low-pass filter coefficient in the Haar function are illustrated in Equations (8) and (9), respectively. In this embodiment, a Haar basis function is used.

$$\text{high-pass filter coefficient} = \{0.5, -0.5\} \quad (8)$$

$$\text{low-pass filter coefficient} = \{0.5, 0.5\} \quad (9)$$

It should be noted that those filter coefficients are used in common between a horizontal direction and a vertical direction.

The filter coefficient reading unit 217 reads the filter coefficients from the basis function ROM 216. The filter coefficient reading unit 217 transfers the high-pass filter coefficient to the horizontal high-pass filter 202, the vertical high-pass filter 206, and the vertical high-pass filter 208. The filter coefficient reading unit 217 transfers the low-pass filter coefficient to the horizontal low-pass filter 203, the vertical low-pass filter 207, and the vertical low-pass filter 209.

After the filter coefficients have been thus transferred to each of the high-pass filters and each of the low-pass filters, the data reading unit 200 reads the original image signal F from the interpolation unit 104, and transfers the original image signal F to the buffer 201.

The original image signal F in the buffer 201 is subjected to the filtering processing in horizontal and vertical directions. The filtering processing is performed at the horizontal high-pass filter 202, the horizontal low-pass filter 203, the vertical high-pass filters 206 and 208, and the vertical low-pass filters 207 and 209. Here, the subsamplers 204 and 205 subsample (downsample) an input picture signal into ½ in the horizontal direction. The subsamplers 210, 211, 212, and 213 subsample an input picture signal into ½ in the vertical direction.

Therefore, an output from the subsampler 210 provides a high-frequency component Hhv1 in both the horizontal and vertical directions, an output from the subsampler 211 provides a high-frequency component Hh1 in the horizontal direction, and an output from the subsampler 212 provides a high-frequency component Hv1 in the vertical direction. An output from the subsampler 213 provides a low-frequency component LL1.

The switch unit 214 successively transfers the three high-frequency components Hhv1, Hh1, and Hv1 and the low-frequency component LL1 that are described above, as wavelet coefficients to the buffer 106. Further, the data transfer control unit 215 transfers the low-frequency component LL1 from the subsample 213 to the buffer 201.

The low-frequency component LL1 thus stored in the buffer 201 is subjected to decomposition at the second stage by the same filtering processing as described above, and three high-frequency components Hhv2, Hh2, and Hv2 and a low-frequency component LL2 are generated.

The above-mentioned process is repeated until the decomposition at the predetermined stage number I has been performed. After the decomposition at the predetermined stage number I has been finished, the high-frequency components Hhvi, Hhi, and Hvi and the low-frequency component LLi (i=1 through I) as the wavelet coefficients are saved into the buffer 106 as band signals. Accordingly, the band signals (Hhvi, Hhi, Hvi, and LLi (i=1 through I) are generated and saved.

(Component Separation Unit 107)

Figure 3:
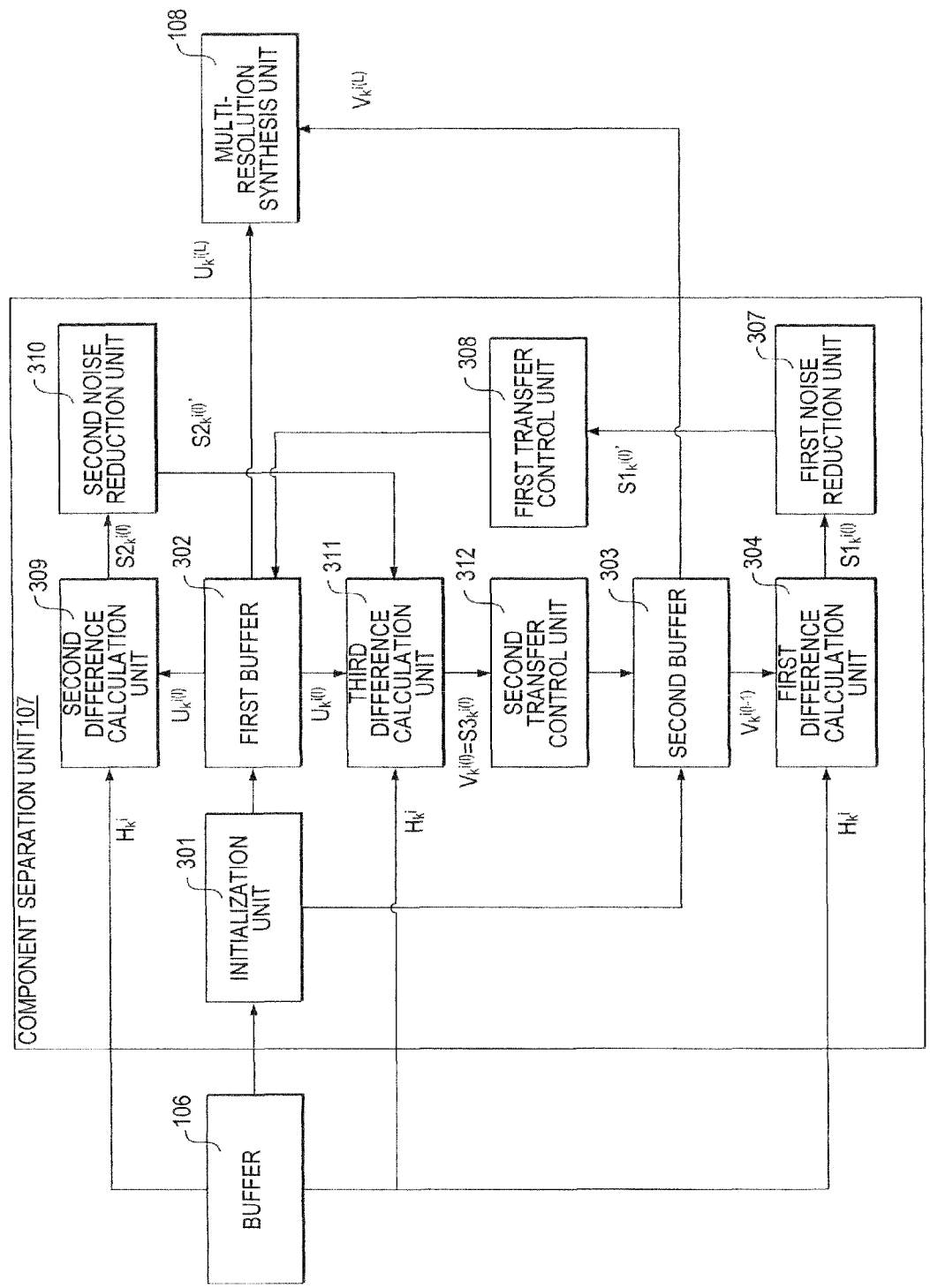
FIG. 3 is a schematic configuration diagram of a component separation unit according to the first embodiment.

Next, FIG. 3 is referenced to describe an operation of the component separation unit 107 in detail.

Here, description is made of the component separation performed by the component separation unit 107. The component separation unit 107 uses a TV-G nonlinear image decomposition model as illustrated in Equation (5) to subject an RGB color image to the component separation. In this case, by introducing the total variation (TV) of color differences (Ur−Ug, Ub−Ug, and Ur−Ub) and color sums (Ur+Ug, Ub+Ug, and Ur+Ub), it is possible to suppress occurrence of color distortion. The TV-G nonlinear image decomposition model that introduces the TV of the color differences and the color sums is formulated as variation problems as illustrated in Equations (10), (11a), and (11b).

$$\inf_{ur,ug,ub \in X} \{J(Ur) + J(Ug) + J(Ub) + \alpha \cdot J(Ur - Ug) + \\ \beta \cdot J(Ur + Ug) + \alpha \cdot J(Ub - Ug) + \beta \cdot J(Ub + Ug) + \\ \alpha \cdot J(Ur - Ub) + \beta \cdot J(Ur + Ub) + \frac{\lambda}{2} \cdot \|Fr - Ur - Vr\|_{L^2}^2 + \\ \frac{\lambda}{2} \cdot \|Fg - Ug - Vg\|_{L^2}^2 + \frac{\lambda}{2} \cdot \|Fb - Ub - Vb\|_{L^2}^2 \} \quad (10)$$

$$\inf_{Vr \in G} \{\|Fr - Ur - Vr\|_{L^2}^2\}, \quad (11a)$$
$$\inf_{Vg \in G} \{\|Fg - Ug - Vg\|_{L^2}^2\},$$
$$\inf_{Vb \in G} \{\|Fb - Ub - Vb\|_{L^2}^2\}$$

$$\inf_{Wr \in X} \{J(Wr) + \frac{1}{2\mu} \cdot \|Fr - Ur - Wr\|_{L^2}^2 \} \quad (11b)$$
$$\inf_{Wg \in X} \{J(Wg) + \frac{1}{2\mu} \cdot \|Fg - Ug - Wg\|_{L^2}^2 \}$$
$$\inf_{Wb \in X} \{J(Wb) + \frac{1}{2\mu} \cdot \|Fb - Ub - Wb\|_{L^2}^2 \}$$

where, Ur, Ug, and Ub are the first components of an R signal, a G signal, and a B signal, respectively, and Vr, Vg, and Vb are the second components of the R signal, the G signal, and the B signal, respectively. It should be noted that Wr, Wg, and Wb defined as follows are introduced into Equation (11a) by use of a solution of the variation problem of Equation (11a):

$$\tilde{V}r, \tilde{V}g, \tilde{V}b$$

which produces three variation problems independent of one another as illustrated in Equation (11b).

$$Wr = Fr - Ur - \tilde{V}r, \; Wg = Fg - Ug - \tilde{V}g, \; Wb = Fb - Ub - \tilde{V}b$$

If all of TV norms in the above-mentioned variation problem are replaced by norms in a Besov norm space $B_1^1(L^1)$, the solution can be found by a shrinkage processing in an orthogonal (approximately, biorthogonal) wavelet transform domain.

In this case, Equation (10) results in a repetitive algorithm using a shrinkage function (specifically, shrinkage function illustrated in Equations (15) and (16)) derived from an L1-L2 optimization problem described in Haruya Aizawa, Yuki Ishii, Takashi Komatsu, Takahiro Saito, "Removal of Signal-Dependent Noise Through the TV-L1 Nonlinear Image Decomposition", Image Media Processing Symposium, 2007, I-4.15, October 2007. This is equivalent to a case where (Fr−Vr, Fg−Vg, and Fb−Vb) are recognized as an RGB three-primary-color input image, and the noise reduction processing is performed by a noise removal method for a wavelet transform domain using the above-mentioned shrinkage function. The noise reduction processing becomes the multi-stage coring processing having the plurality of coring ranges in consideration or the color sums and the color differences among color signals.

Further, Equation (11b) results in a wavelet shrinkage method using the soft thresholding with a threshold value of μ. This is equivalent to a case where (Fr−Ur, Fg−Ug, and Fb−Ub) are recognized as an RGB three-primary-color input image, and the noise reduction processing is performed by the wavelet shrinkage method using the soft thresholding with the threshold parameter of μ. The soft thresholding is a general (single-stage) coring processing having a single coring range.

The component separation unit 107 includes an initialization unit 301, a first buffer 302, a second buffer 303, a first difference calculation unit 304, a first noise reduction unit 307, and a first transfer control unit 308. Further, the component separation unit 107 includes a second difference calculation unit 309, a second noise reduction unit 310, a third difference calculation unit 311, and a second transfer control unit 312.

The buffer 106 is connected to the initialization unit 301, the first difference calculation unit 304, the second difference calculation unit 309, and the third difference calculation unit 311. The initialization unit 301 is connected to the first buffer 302 (first storage unit) and the second buffer 303 (second storage unit).

The second buffer 303 is connected to the first difference calculation unit 304 and the synthesis unit 108. The first difference calculation unit 304 is connected to the first noise reduction unit 307. The first noise reduction unit 307 is connected to the first transfer control unit 308. The first transfer control unit 308 is connected to the first buffer 302. The first buffer 302 is connected to the second difference calculation unit 309, the third difference calculation unit 311, and the synthesis unit 108. The second difference calculation unit 309 is connected to the second noise reduction unit 310. The second noise reduction unit 310 is connected to the third difference calculation unit 311. The third difference calculation unit 311 is connected to the second transfer control unit 312. The second transfer control unit 312 is connected to the second buffer 303.

The component separation unit 107 acquires the high-frequency components (wavelet coefficients) of each of the color signals from the buffer 106, and decomposes each of the high-frequency components into the first component and the second component. The decomposition is performed by repeatedly performing a predetermined noise reduction processing and a predetermined difference calculation processing. The system controller 100 serving as the control unit controls the repetition of operations for the noise reduction processing and the difference calculation processing.

In this embodiment, the first buffer 302 represents a buffer memory for retaining the first component, and the second buffer 303 represents a buffer memory for retaining the second component. Each time the noise reduction processing and the difference calculation processing are repeated, the first component and the second component retained in the first buffer 302 and the second buffer 303, respectively, are updated to improve the decomposition precision, which leads to optimization. When a predetermined repetition count L is reached, the first component ($U_k^{i(L)}$ described later) and the second component ($V_k^{i(L)}$ described later) recorded in the first buffer 302 and the second buffer 303, respectively, are transferred to the synthesis unit 108.

It should be noted that in this embodiment, the first transfer control unit 308 constitutes an extraction unit of the component extraction/correction device, but this invention is not limited thereto. For example, for the first multi-stage coring processing, the initialization unit 301 functions as the extraction unit. The extraction unit is a unit for extracting the first component (skeleton component) from among a plurality of components constituting a band signal.

Further in this embodiment, the first noise reduction unit 307 constitutes a first correction unit for performing a first correction processing for correcting the first component (skeleton component). Meanwhile the second noise reduction unit 310 and the third difference calculation unit 311 constitute a second correction unit for performing a second correction processing for correcting one component (second component) other than the skeleton component.

Hereinbelow, as an example thereof, description is made of a case where a first component $U_k^{i(l)}$ and a second component $V_k^{i(l)}$ are separated from the high-frequency component $H_k^i$ (one of the wavelet coefficients Hhvi, Hhi, and Hvi) related to a color signal $F_k$. Here, a subscript k (=r, g, and b) is a symbol representing a color. The R signal is represented by k=r, the G signal is represented by k=g, and the B signal is represented by k=b. A superscript i (i=0 through I) represents the stage number of the multi-resolution decomposition, and a superscript l (l=0 through L) represents the repetition count (number of repetition).

First, in the repetition with l=0, an initialization processing is performed on the first buffer 302 retaining the first component and the second buffer 303 retaining the second component. The initialization unit 301 acquires high-frequency components $H_r^i$, $H_g^i$, and $H_b^i$ of the band signals corresponding to the color signals Fr, Fg, and Fb, respectively, from the buffer 106. The initialization unit 301 transfers the acquired high-frequency components $H_r^i$, $H_g^i$, and $H_b^i$ to the first buffer 302, and records the high-frequency components $H_r^i$, $H_g^i$, and $H_b^i$ into the first buffer 302. Simultaneously, the initialization unit 301 controls the second buffer 303 to have all of values therein cleared to zero.

In other words, the initialization unit 301 has a function of performing the initialization processing by substituting, if l=0, the first component with the high-frequency component $H_k^i$ and the second component with zero as initial values. Such an initialization processing allows the first component and the second component to be calculated appropriately. It should be noted that if l=0, the initialization unit 301 functions as the extraction unit for extracting the first component (skeleton component) from among the plurality of components constituting the band signal.

Next, description is made of a component extraction/correction processing performed at the l-th time (l≠0). The processing is not independently performed on each of the color signals. In one repetition processing (for example, processing at the l-th time), the processing for all of the color signals (k=r, g, and b) is performed once, and after that, the subsequent repetition processing (processing at the (l+1)st time) is performed.

First, the first difference calculation unit 304 acquires the high-frequency component $H_k^i$ of the color signal $F_k$ from the buffer 106 and a second component $V_k^{i(l-1)}$ from the second buffer 303, and calculates a first difference component $S1_k^{i(l)}$ (first difference value) based on Equation (12). It should be noted that if l=1, $V_k^{i(l-1)}=V_k^{i(0)}=0$.

$$S1_k^{i(l)}=H_k^i-V_k^{i(l-1)} \tag{12}$$

The calculated first difference component $S1_k^{i(l)}$ is transferred to the first noise reduction unit 307.

The first noise reduction unit 307 subjects the first difference component $S1_k^{i(l)}$ to the multi-stage coring processing having the plurality of coring ranges in consideration of the color sum and the color difference among the color signals. Details of the processing performed by the first noise reduction unit 307 are described later. It should be noted that the multi-stage coring processing may be repeated M times as described later.

The first transfer control unit 308 controls a first difference component $S1_k^{i(l)\prime}$ obtained after the multi-stage coring processing to be transferred to the first buffer 302. By overwriting a first component $U_k^{i(l-1)}$ recorded in the first buffer 302 with the first difference component $S1_k^{i(l)\prime}$ as the first component $U_k^{i(l)}$, the first component is corrected/updated ($U_k^{i(l)}=S1_k^{i(l)\prime}$). It should be noted that if l=1, $U_k^{i(l-1)}=U_k^{i(0)}=H_k^i$.

Subsequently, the second difference calculation unit 309 acquires the high-frequency component $H_k^i$ from the buffer 106 and the first component $U_k^{i(l)}$ from the first buffer 302, and calculates a second difference component $S2_k^{i(l)}$ (second difference value) based on Equation (13).

$$S2_k^{i(l)}=H_k^i-U_k^{i(l)} \tag{13}$$

The calculated second difference component $S2_k^{i(l)}$ is transferred to the second noise reduction unit 310.

The second noise reduction unit 310 subjects the second difference component $S2_k^{i(l)}$ to a general single-stage coring processing (soft thresholding) having one coring range. Here, a second difference component obtained after the single-stage coring processing is set as $S2_k^{i(l)\prime}$. As described later, the second difference component $S2_k^{i(l)\prime}$ obtained after the single-stage coring processing is also called an "index value". Details of the processing performed by the second noise reduction unit 310 are described later.

Subsequently, the third difference calculation unit 311 acquires the high-frequency component $H_k^i$ from the buffer 106, the first component $U_k^{i(l)}$ from the first buffer 302, and the second difference component $S2_k^{i(l)\prime}$ obtained after the single-stage coring processing from the second noise reduction unit 310. The third difference calculation unit 311 calculates a third difference component $S3_k^{i(l)}$ (third difference value) based on Equation (14).

$$S3_k^{i(l)}=H_k^i-U_k^{i(l)}-S2_k^{i(l)\prime} \tag{14}$$

The third difference component $S3_k^{i(l)}$ corresponds to a noise portion removed from the second difference component $S2_k^{i(l)}$ by the second noise reduction unit 310 performing the single-stage coring processing. The second transfer control unit 312 controls the third difference component $S3_k^{i(l)}$ calculated by the third difference calculation unit 311 to be transferred to the second buffer 303. By overwriting the second component $V_k^{i(l-1)}$ recorded in the second buffer 303 with the third difference component $S3_k^{i(l)}$ as the second component $V_k^{i(l)}$, the second component is corrected/updated ($V_k^{i(l)}=S3_k^{i(l)}$). It should be noted that if l=1, $V_k^{i(l-1)}=V_k^{i(0)}=0$.

It should be noted that the second component $V_k^{i(l)}$ (=$S3_k^{i(l)}$) changes depending upon the second difference component $S2_k^{i(l)\prime}$, and hence the second difference component $S2_k^{i(l)\prime}$ is called the index value for determining the second component.

The above-mentioned processing is applied to each of the color signals (k=r, g, and b). The repetition processing at the l-th time is completed at a time point when the processing for all of the color signals is completed.

When the repetition count l reaches L, the first component $U_k^{i(L)}$ and the second component $V_k^{i(L)}$ retained in the first buffer 302 and the second buffer 303, respectively, are set as final outputs and transferred to the synthesis unit 108.

In this embodiment, the repetition count at which the repetition processing stops, is preset to a predetermined count L, but may be set variable according to the decomposition precision. For example, the repetition processing may be configured to stop if an absolute value of a difference between the first component $U_k^{i(l)}$ at the l-th time and the first component $U_k^{i(l-1)}$ at the (l−1)st time or an absolute value of a difference between the second component $V_k^{i(l)}$ at the l-th time and the second component $V_k^{i(l-1)}$ at the (l−1)st time becomes equal to or smaller than a predetermined threshold value. Therefore, the repetition processing is stopped if there is substantially no change in the first component or the second component due to the repetition.

It should be noted that the repetition processing is performed in this embodiment, but the component separation unit 107 may be configured to perform only the processing at the l=1st time without performing the repetition processing, which is performed after the initialization processing at the l=0th time.

(First Noise Reduction Unit 307)

Figure 4:
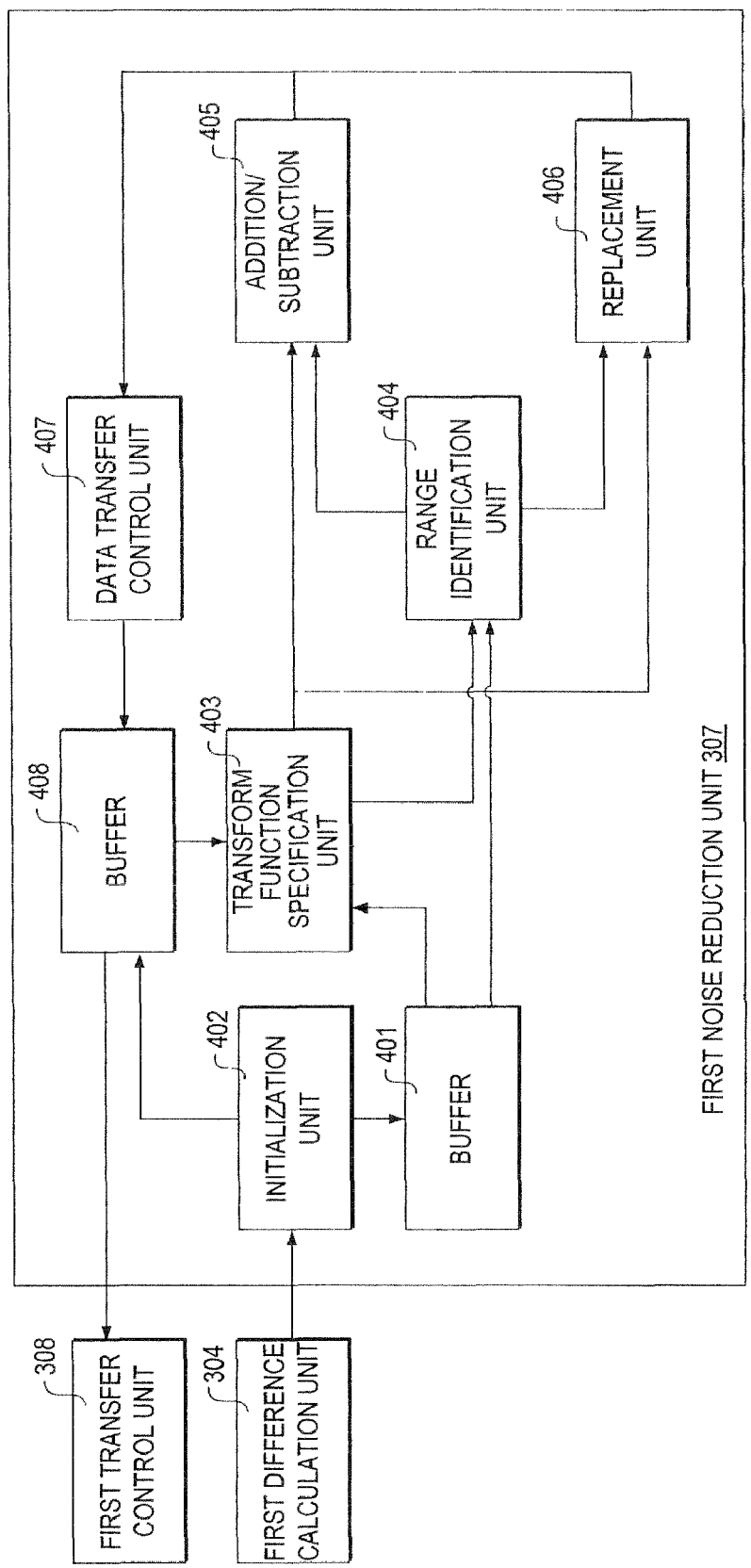
FIG. 4 is a schematic configuration diagram of a first noise reduction unit according to the first embodiment.

Next, FIG. 4 is referenced to describe an operation of the first noise reduction unit 307 in detail.

The first noise reduction unit 307 includes a buffer 401, an initialization unit 402, a transform function specification unit 403, a range identification unit 404, an addition/subtraction, unit 405, a replacement unit 406, a data transfer control unit 407, and a buffer 408.

The first difference calculation unit 304 is connected to the buffer 401 via the initialization unit 402. The buffer 401 is connected to the transform function specification unit 403 and the range identification unit 404. The initialization unit 402 is connected to the buffer 408. The transform function specification unit 403 is connected to the range identification unit 404, the addition/subtraction unit 405, and the replacement unit 406. The range identification unit 404 is connected to the addition/subtraction unit 405 and the replacement unit 406. The addition/subtraction unit 405 and the replacement unit 406 are connected to the buffer 408 via the data transfer control unit 407. The buffer 408 is connected to the transform function specification unit 403 and the first transfer control unit 308.

The first noise reduction unit 307 performs the multi-stage coring processing on the above-mentioned difference signal transferred from the first difference calculation unit 304. The multi-stage coring processing is a processing in which the input signal is transformed into a predetermined output value based on the transform function for which the plurality of coring ranges are set. The plurality of coring ranges are determined by a plurality of pairs of the lower-limit threshold value and the upper-limit threshold value, and an output value corresponds to each of the coring ranges.

The coring range of the transform function is set by using not only the input signal related to the color signal to be processed but also the color signal not to be processed. Further, the multi-stage coring processing is repeatedly performed as in the component decomposition processing. Results of the multi-stage coring processing (noise reduction) are updated at all times owing to the repetition of the processing, and become the final outputs at a time point when a predetermined repetition count M is reached. Further, in one repetition, one multi-stage coring processing is performed for each of the R, G, and B signals, and then the subsequent repetition processing is performed.

Hereinbelow, as an example thereof, description is made of a case where the multi-stage coring processing (noise reduction processing) is performed on first difference signals $S_r^i$, $S_g^i$, and $S_b^i$ related to the high-frequency components $H_r^i$, $H_g^i$, and $H_b^i$, respectively, of the color signals. Here, the first difference signals $S_r^i$, $S_g^i$, and $S_b^i$ correspond to the first difference components $S1_r^{i(l)}$, $S1_g^{i(l)}$, and $S1_b^{i(l)}$, respectively, before being subjected to the multi-stage coring processing ($S_r^i = S1_r^{i(l)}$, $S1_g^i = S1_g^{i(l)}$, and $S_b^i = S1_b^{i(l)}$).

Difference signals $S_r^i(m)$, $S_g^i(m)$, and $S_b^i(m)$ are generated by the multi-stage coring processing at the m-th time. Herein, subscripts r, g, and b represent the R signal, the G signal, and the B signal, respectively, a superscript i (i=0 through I) represents the stage number of the multi-resolution decomposition, and m (m=0 through M) represents the repetition count (number of repetition) of the multi-stage coring processing.

First, in the repetition with m=0, the initialization processing for the buffer 401 and the buffer 408 is performed. In other words, the difference signals $S_r^i$, $S_g^i$, and $S_b^i$ transferred from the first difference calculation unit 304 to the initialization unit 402 are recorded into the buffer 401 and the buffer 408 as difference signals $S_r^i(0)$, $S_g^i(0)$, and $S_b^i(0)$ for the repetition at the m=0th time.

Next, description is made of a processing performed at the m-th time (m≠0). Here, there is no particular restriction imposed on an order in which the color signals are processed in one repetition, and in this embodiment, the multi-stage coring is performed for each of the R→G→B signals in the stated order.

First, the transform function specification unit 403 acquires the difference signals $S_r^i(0)$, $S_g^i(0)$, and $S_b^i(0)$ for the m=0th time which are stored in the buffer 401 and are related to the color signals to be processed. Further, the transform function specification unit 403 acquires the difference signals generated by the repetition processing at the (m−1)st time or the m-th time, which are stored in the buffer 408 and are related to the color signals not to be processed. In this embodiment, in a case of the multi-stage coring processing related to the R signal, the transform function specification unit 403 acquires the difference signals $S_r^i(0)$, $S_g^i(m-1)$, and $S_b^i(m-1)$. In a case of the multi-stage coring processing related to the G signal, the transform function specification unit 403 acquires the difference signals $S_g^i(0)$, $S_r^i(m)$, and $S_b^i(m-1)$. In a case of the multi-stage coring processing related to the B signal, the transform function specification unit 403 acquires the difference signals $S_b^i(0)$, $S_r^i(m)$, and $S_g^i(m)$.

The transform function to be applied to the coring is specified based on the difference signals acquired as described above and predetermined parameters α, β, and λ that are set in advance. Here, α is a parameter for such an adjustment that a degree of noise reduction becomes larger if the difference in the signal value among the color signals is large β is a parameter for such an adjustment that the degree of noise reduction becomes larger if the sum value of the signal values among the color signals is large.

Hereinafter, description is made only of a case where the G signal is set to be subjected to the multi-stage coring processing and the transform function for the G signal is to be specified. When the R signal is set to be subjected to the multi-stage coring processing, the transform function may be specified by replacing $\{S_g^i(0), S_r^i(m), \text{ and } S_b^i(m-1)\}$ with $\{S_r^i(0), S_g^i(m-1) \text{ and } S_b^i(m-1)\}$. When the B signal is set to be subjected to the multi-stage coring processing, the transform function may be specified by replacing $\{S_g^i(0), S_r^i(m), \text{ and } S_b^i(m-1)\}$ with $\{S_b^i(0), S_r^i(m), \text{ and } S_g^i(m)\}$.

Figure 5A:
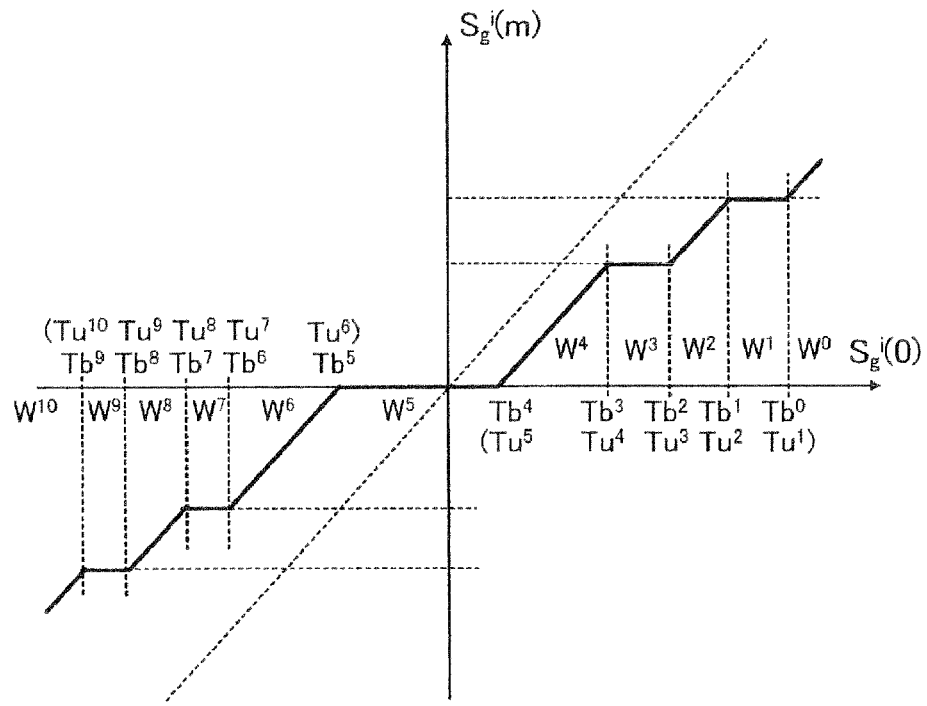
FIG. 5A is a graph illustrating an example of a transform function for a multi-stage coring processing.

First, $S_r^i(m)$ and $S_b^i(m-1)$ are compared with each other. If $S_r^i(m)$ and $S_b^i(m-1)$ have the same sign, and if $S_r^i(m) > 0$, $S_b^i(m-1)>0$, and $S_r^i(m)>S_b^i(m-1)$, the transform function for the G signal is specified as a staircase-like function constituted by a plurality of intervals $W^j$ (j=0 through 10) as illustrated in, for example, Equation (15). FIG. 5A illustrates the transform function specified by Equation (15).

Interval $W^0$: $Tb^0 = S_r^i(m) + (1+2\alpha+2\beta)/\lambda \rightarrow S_g^i(m) = S_g^i(0) - (1+2\alpha+2\beta)/\lambda$ Interval $W^1$: $Tb^1 = S_r^i(m) + (1+2\beta)/\lambda$, $Tu^1 = S_r^i(m) + (1+2\alpha+2\beta)/\lambda \rightarrow S_g^i(m) = S_r^i(m)$ Interval $W^2$: $Tb^2 = S_b^i(m-1) + (1+2\beta)/\lambda$, $Tu^2 = S_r^i(m) + (1+2\beta)/\lambda \rightarrow S_g^i(m) = S_g^i(0) - (1+2\beta)/\lambda$ Interval $W^3$: $Tb^3 = S_b^i(m-1) + (1+2\beta-2\alpha)/\lambda$, $Tu^3 = S_b^i(m-1) + (1+2\beta)/\lambda \rightarrow S_g^i(m) = S_b^i(m-1)$ Interval $W^4$: $Tb^4 = (1+2\beta-2\alpha)/\lambda$, $Tu^4 = S_b^i(m-1) + (1+2\beta-2\alpha)/\lambda \rightarrow S_g^i(m) = S_g^i(0) - (1+2\beta-2\alpha)/\lambda$ Interval $W^5$: $Tb^5 = -(1+2\alpha-2\beta)/\lambda$, $Tu^5 = (1+2\beta-2\alpha)/\lambda \rightarrow S_g^i(m) = 0$ Interval $W^6$: $Tb^6 = -S_b^i(m-1) - (1+2\alpha-2\beta)/\lambda$, $Tu^6 = -(1+2\alpha-2\beta)/\lambda \rightarrow S_g^i(m) = S_g^i(0) + (1+2\alpha-2\beta)/\lambda$ Interval $W^7$: $Tb^7 = -S_b^i(m-1) - (1+2\alpha)/\lambda$, $Tu^7 = -S_b^i(m-1) - (1+2\alpha-2\beta)/\lambda \rightarrow S_g^i(m) = -S_b^i(m-1)$ Interval $W^8$: $Tb^8 = -S_r^i(m) - (1+2\alpha)/\lambda$, $Tu^8 = -S_b^i(m-1) - (1+2\alpha)/\lambda \rightarrow S_g^i(m) = S_g^i(0) + (1+2\alpha)/\lambda$ Interval $W^9$: $Tb^9 = -S_r^i(m) - (1+2\alpha+2\beta)/\lambda$, $Tu^9 = -S_r^i(m) - (1+2\alpha)/\lambda \rightarrow S_g^i(m) = -S_r^i(m)$ Interval $W^{10}$: $Tu^{10} = -S_r^i(m) - (1+2\alpha+2\beta)/\lambda \rightarrow S_g^i(m) = S_g^i(0) + (1+2\alpha+2\beta)/\lambda$ (15)

Here, the intervals $W^j$ (j=0 through 10) represent intervals related to $S_g^i(0)$. $Tb^j$ and $Tu^j$ represent a lower-limit value and an upper-limit value of $W^j$, respectively, and $S_g^i(m)$ represents an output value. The lower-limit value and the upper-limit value $Tb^j$ and $Tu^j$ and the output value $S_g^i(m)$ are calculated based on $\alpha$, $\beta$, $\lambda$, $S_g^i(0)$, $S_r^i(m)$, and $S_b^i(m-1)$. The intervals $W^j$ (j=0 through 10) vary depending upon the value of the repetition count m.

Further, the intervals whose outputs are constant values such as the intervals $W^1$, $W^3$, $W^5$, and $W^7$ are defined as coring range intervals. A plurality of coring range intervals are set within the transform function. The transform function is continuous, and an inclination of the transform function within non-coring range intervals other than the coring range intervals is fixed to "1". Therefore, if the lower-limit value, the upper-limit value, and the output value in the coring range interval are found, the output value in the non-coring range interval is uniquely calculated. Further, the inclination is 1 in the non-coring range interval, and hence the difference between the transform function and a linear function $S_g^i(m) = S_g^i(0)$ becomes a constant value in the non-coring range interval.

If $S_r^i(m)>0$, $S_b^i(m-1)>0$, and $S_r^i(m)<S_b^i(m-1)$, in Equation (15), by replacing $S_b^i(m-1)$ with $S_r^i(m)$ and $S_r^i(m)$ with $S_b^i(m-1)$, it is possible to calculate the coring range interval and the output value.

If $S_r^i(m)<0$, $S_b^i(m-1)<0$, and $|S_r^i(m)|>|S_b^i(m-1)|$, in Equation (15), by replacing $S_b^i(m-1)$ with $-S_b^i(m-1)$, $S_r^i(m)$ with $-S_r^i(m)$, and $\alpha$ and $\beta$ with $\beta$ and $\alpha$, respectively, it is possible to calculate the coring range interval and the output value.

If $S_r^i(m)<0$, $S_b^i(m-1)<0$, and $|S_r^i(m)|<|S_b^i(m-1)|$, in Equation (15), by replacing $S_b^i(m-1)$ with $-S_r^i(m)$, $S_r^i(m)$ with $-S_b^i(m-1)$, and $\alpha$ and $\beta$ with $\beta$ and $\alpha$, respectively, it is possible to calculate the coring range interval and the output value.

Figure 5B:
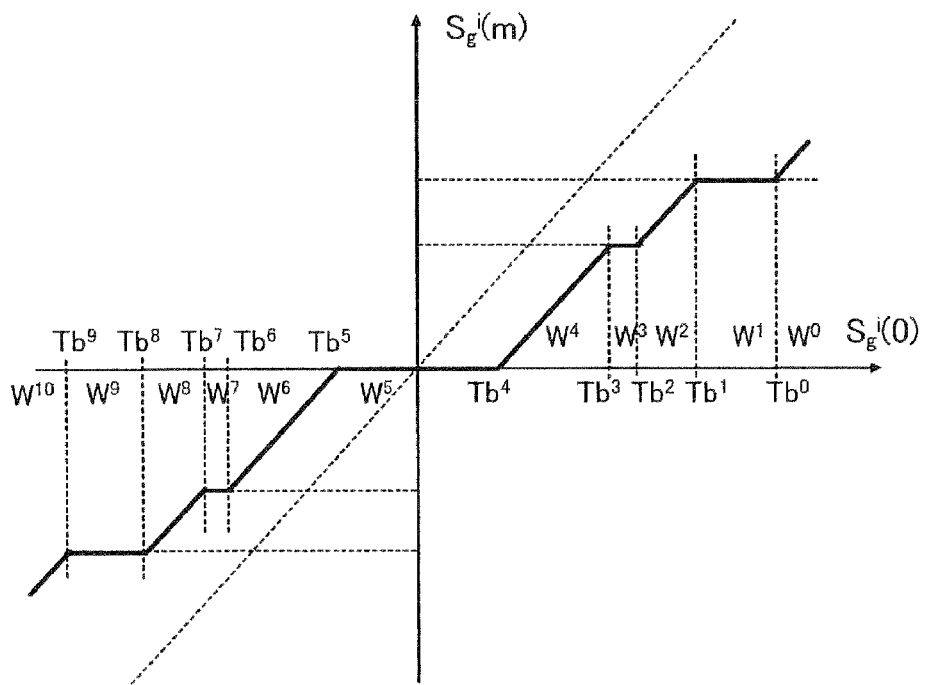
FIG. 5B is a graph illustrating another example of the transform function for the multi-stage coring processing.

If $S_r^i(m)$ and $S_b^i(m-1)$ have different signs, and if $S_r^i(m)>0$, $S_b^i(m-1)<0$, and $|S_r^i(m)|>|S_b^i(m-1)|$, the transform function is specified as illustrated in, for example, Equation (16). FIG. 5B illustrates the transform function specified by Equation (16).

Interval $W^0$: $Tb^0 = S_r^i(m) + (1+2\alpha+2\beta)/\lambda \rightarrow S_g^i(m) = S_g^i(0) - (1+2\alpha+2\beta)/\lambda$ Interval $W^1$: $Tb^1 = S_r^i(m) + (1+2\beta)/\lambda$, $Tu^1 = S_r^i(m) + (1+2\alpha+2\beta)/\lambda \rightarrow S_g^i(m) = S_r^i(m)$ Interval $W^2$: $Tb^2 = -S_b^i(m-1) + (1+2\beta)/\lambda$, $Tu^2 = S_r^i(m) + (1+2\beta)/\lambda \rightarrow S_g^i(m) = S_g^i(0) - (1+2\beta)/\lambda$ Interval $W^3$: $Tb^3 = -S_b^i(m-1) + 1/\lambda$, $Tu^3 = -S_b^i(m-1) + (1+2\beta)/\lambda \rightarrow S_g^i(m) = -S_b^i(m-1)$ Interval $W^4$: $Tb^4 = 1/\lambda$, $Tu^4 = -S_b^i(m-1) + 1/\lambda \rightarrow S_g^i(m) = S_g^i(0) - 1/\lambda$ Interval $W^5$: $Tb^5 = -1/\lambda$, $Tu^5 = 1/\lambda \rightarrow S_g^i(m) = 0$ Interval $W^6$: $Tb^6 = S_b^i(m-1) - 1/\lambda$, $Tu^6 = -1/\lambda \rightarrow S_g^i(m) = S_g^i(0) + 1/\lambda$ Interval $W^7$: $Tb^7 = S_b^i(m-1) - (1+2\alpha)/\lambda$, $Tu^7 = S_b^i(m-1) - 1/\lambda \rightarrow S_g^i(m) = S_b^i(m-1)$ Interval $W^8$: $Tb^8 = -S_r^i(m) - (1+2\alpha)/\lambda$, $Tu^8 = S_b^i(m-1) - (1+2\alpha)/\lambda \rightarrow S_g^i(m) = S_g^i(0) + (1+2\alpha)/\lambda$ Interval $W^9$: $Tb^9 = -S_r^i(m) - (1+2\alpha+2\beta)/\lambda$, $Tu^9 = -S_r^i(m) - (1+2\alpha)/\lambda \rightarrow S_g^i(m) = -S_r^i(m)$ Interval $W^{10}$: $Tu^{10} = -S_r^i(m) - (1+2\alpha+2\beta)/\lambda \rightarrow S_g^i(m) = S_g^i(0) + (1+2\alpha+2\beta)/\lambda$ (16)

If $S_r^i(m)>0$, $S_b^i(m-1)<0$, and $|S_r^i(m)|<|S_b^i(m-1)|$, in Equation (16), by replacing $S_r^i(m)$ with $-S_b^i(m-1)$, $-S_b^i(m-1)$ with $S_r^i(m)$, and $\alpha$ and $\beta$ with $\beta$ and $\alpha$, respectively, it is possible to calculate the coring range interval and the output value.

If $S_r^i(m)<0$, $S_b^i(m-1)>0$, and $|S_r^i(m)|>|S_b^i(m-1)|$, in Equation (16), by replacing $-S_b^i(m-1)$ with $S_b^i(m-1)$, $S_r^i(m)$ with $-S_r^i(m)$, and $\alpha$ and $\beta$ with $\beta$ and $\alpha$, respectively, it is possible to calculate the coring range interval and the output value.

If $S_r^i(m)<0$, $S_b^i(m-1)>0$, and $|S_r^i(m)|<|S_b^i(m-1)|$, in Equation (16), by replacing $S_r^i(m)$ with $S_b^i(m-1)$ and $-S_b^i(m-1)$ with $-S_r^i(m)$, it is possible to calculate the coring range interval and the output value.

Regarding another transform function for the coring with respect to $S_r^i(m)$ and $S_b^i(m-1)$, by replacing $S_r^i(m)$, $S_g^i(0)$, and $S_b^i(m-1)$ in the transform function $S_g^i(m)$ as described above, it is possible to easily calculate the transform function for $S_r^i(m)$ or $S_b^i(m-1)$.

In this embodiment, for specifying the transform function at the first noise reduction unit 307, the lower-limit value $Tb^j$, the upper-limit value $Tu^j$, and the output value $S_g^i(m)$ that are related to the coring range interval are transferred from the transform function specification unit 403 to the range identification unit 404. Further, the lower-limit value and the upper-limit value in the non-coring range interval and a difference between the transform function in the non-coring range interval and the above-mentioned linear function $S_g^i(m) = S_g^i(0)$ are transferred from the transform function specification unit 403 to the range identification unit 404.

Subsequently, the range identification unit 404 acquires the transform function (the lower-limit value and the upper-limit value for the coring range interval) set at the transform function specification unit 403, and from the buffer 401 the difference signal $S_g^i(0)$. The range identification unit 404 compares the value of the difference signal $S_g^i(0)$ with the lower-limit value and the upper-limit value in the coring range interval if the value of the difference signal $S_g^i(0)$ belongs to the coring range interval, the signal value of the difference signal $S_g^i(0)$ is transferred to the replacement unit 406. If the value of the difference signal $S_g^i(0)$ belongs to the outside of the coring range interval, the signal value of the difference signal $S_g^i(0)$ is transferred to the addition/subtraction unit 405.

The replacement unit 406 acquires from the transform function specification unit 403 the output value corresponding to the coring range interval to which the signal value of the difference signal $S_g^i(0)$ belongs, and replaces the signal value of the difference signal with the output value $S_g^i(m)$. The data transfer control unit 407 controls the signal value obtained after the replacement to be transferred to the buffer 408. The above-mentioned output value overwrites the difference signal $S_g^i(m-1)$ in the buffer 408 as the signal value of the difference signal $S_g^i(m)$. In other words, the output value corresponding to the coring range interval to which the signal value of the difference signal $S_g^i(0)$ belongs becomes the signal value of the difference signal $S_g^i(m)$.

The addition/subtraction unit 405 acquires from the transform function specification unit 403 the difference between the above-mentioned transform function in the non-coring range interval and the above-mentioned linear function $S_g^i(m)=S_g^i(0)$, and adds the difference to the signal value of the difference signal $S_g^i(0)$. The data transfer control unit 407 controls the signal value obtained by the addition to be transferred to the buffer 408. The signal value obtained by the addition overwrites the difference signal $S_g^i(m-1)$ in the buffer 408 as the signal value of the difference signal $S_g^i(m)$.

The above-mentioned processing is applied to the difference signal related to the R→G→B signals in the stated order. After the multi-stage coring processing is performed once per color signal, one cycle of the repetition processing is brought to an end.

At a time when the repetition processing has been finished M times, $S_r^i(M)$, $S_g^i(M)$ and $S_b^i(M)$ recorded in the buffer 408 are controlled by the first transfer control unit 308 to be transferred to the first buffer 302, and are recorded as first components $U_r^{i(I)}$, $U_g^{i(I)}$, and $U_b^{i(I)}$, respectively. It should be noted that $S_r^i(M)$, $S_g^i(M)$, and $S_b^i(M)$ correspond to the above-mentioned first difference components $S1_r^{i(I)}$, $S1_g^{i(I)}$, and $S1_b^{i(I)}$ after being subjected to the multi-stage coring processing, respectively.

It should be noted that the repetition processing is performed in this embodiment, but the first noise reduction unit 307 may be configured to perform only the processing at the m=1st time without performing the repetition processing, which is performed after the initialization processing at the m=0th time.

(Second Noise Reduction Unit 310)

Figure 6:
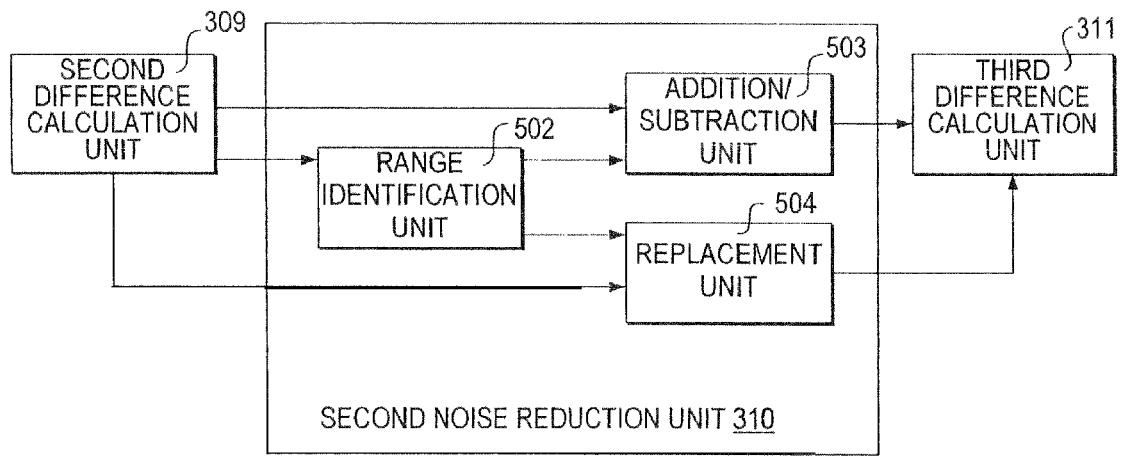
FIG. 6 is a schematic configuration diagram of a second noise reduction unit according to the first embodiment.

Next, FIG. 6 is referenced to describe an operation of the second noise reduction unit 310 in detail.

The second noise reduction unit 310 includes a range identification unit 502, an addition/subtraction unit 503, and a replacement unit 504. The second difference calculation unit 309 is connected to the range identification unit 502, the addition/subtraction unit 503, and the replacement unit 504. The range identification unit 502 is connected to the addition/subtraction unit 503 and the replacement unit 504. The addition/subtraction unit 503 and the replacement unit 504 are each connected to the third difference calculation unit 311.

The second noise reduction unit 310 performs the single-stage coring processing (soft thresholding) on the above-mentioned second difference component $S2_k^{i(I)}$ transferred from the second difference calculation unit 309. Unlike in the multi-stage coring processing, based on the transform function in which one coring range is set, the input signal to the second noise reduction unit 310 is transformed into a predetermined value. Further, in this embodiment, the soft thresholding is performed only once instead of being repeated, but this invention is not limited thereto.

Hereinbelow, as an example thereof, description is made of a case of generating a difference signal $S^{i\prime}$ obtained by performing the noise reduction processing on a difference signal $S^i$ related to a high-frequency component $H^i$ of each of the color signals. Here, the superscript i (i=0 through I) represents the stage number of the multi-resolution decomposition. Here, $S^i$ corresponds to the above-mentioned second difference component $S2_k^{i(I)}$ before being subjected to the single-stage coring processing. $S^{i\prime}$ corresponds to the second difference component $S2_k^{i(I)\prime}$ after being subjected to the single-stage coring processing ($S^i=S2_k^{i(I)}$, and $S^{i\prime}=S2_k^{i(I)\prime}$).

Figure 7:
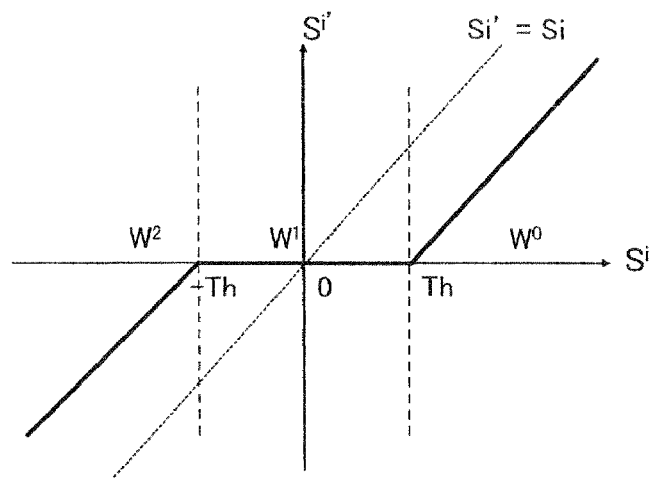
FIG. 7 is a graph illustrating a transform function for a single-stage coring processing (soft thresholding).

First, the range identification unit 502 acquires the difference signal $S^i$ from the second difference calculation unit 309. The transform function for the single-stage coring processing is specified as the staircase-like function constituted by the plurality of intervals $W^j$ (j=0 through 2) as illustrated in, for example, Equation (17). FIG. 7 illustrates the transform function specified by Equation (17).

Interval $W^0$: $Tb^0=Th \rightarrow S^{i\prime}=S^i-Th$

Interval $W^1$: $Tb^1=-Th$, $Tu^1=Th \rightarrow S^{i\prime}=0$

Interval $W^2$: $Tu^2=-Th \rightarrow S^{i\prime}=S^i+Th$ (17)

Here, $Tb^i$ and $Tu^i$ represent the lower-limit value and the upper-limit value of the interval $W^j$, and $S^{i\prime}$ represents the output value. The interval $W^1$ indicates the coring range set by a threshold value Th, which is a range from $-Th$ to $Th$.

First, the range identification unit 502 acquires the difference signal $S^i$ ($=S2_k^{i(I)}$) from the second difference calculation unit 309. The range identification unit 502 compares the value of the difference signal $S^i$ with the lower-limit value $-Th$ and the upper-limit value Th in the coring range interval. If the difference signal $S^i$ belongs to the coring range interval, the signal value of the difference signal $S^i$ is transferred to the replacement unit 504. If the difference signal $S^i$ belongs to the outside of the coring range interval, the signal value of the difference signal $S^i$ is transferred to the addition/subtraction unit 503.

The replacement unit 504 replaces the signal value of the difference signal $S^i$ with the output value "0" corresponding to the coring range interval to which the signal value of the difference signal $S^i$ belongs. The output value obtained after the replacement is transferred to the third difference calculation unit 311 as $S^{i\prime}$ ($=S2_k^{i(I)\prime}$).

Based on the transform function illustrated in Equation (17), the addition/subtraction unit 503 calculates $S^i-Th$ if $Th<S^i$, and calculates $S^i+Th$ if $S^i<-Th$. The addition/subtraction unit 503 transfers $S^i-Th$ or $S^i+Th$ to the third difference calculation unit 311 as $S^{i\prime}$ ($=S2_k^{i(I)\prime}$).

(Multi-Resolution Synthesis Unit 108)

Figure 8:
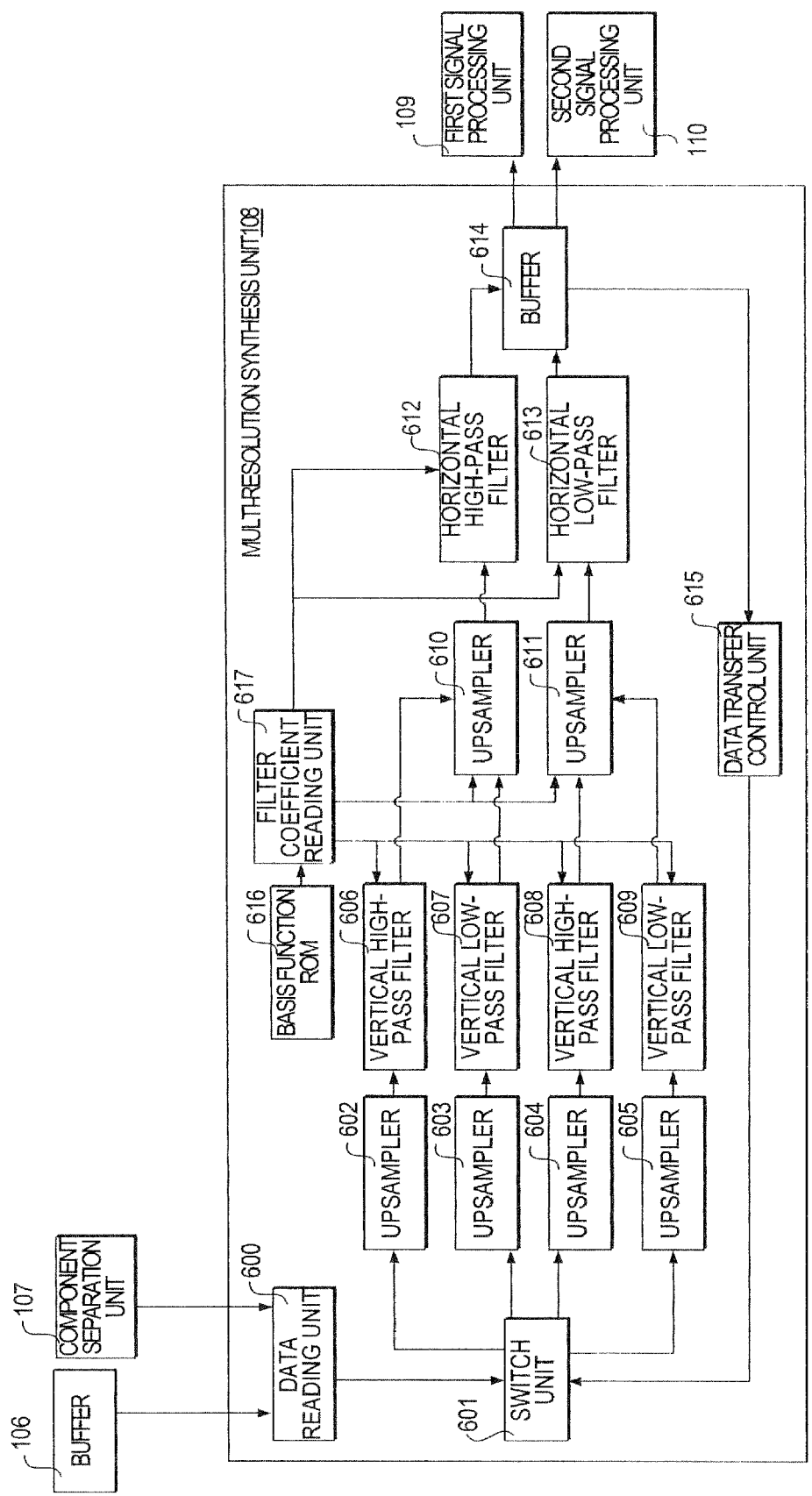
FIG. 8 is a schematic configuration diagram of a multi-resolution synthesis unit according to the first embodiment.

Next, FIG. 8 is referenced to describe an operation of the multi-resolution synthesis unit 108.

The synthesis unit 108 includes a data reading unit 600, a switch unit 601, an upsampler 602, an upsampler 603, an upsampler 604, and an upsampler 605. Further, the synthesis unit 108 includes a vertical high-pass filter 606, a vertical low-pass filter 607, a vertical high-pass filter 608, a vertical low-pass filter 609, an upsampler 610, and an upsampler 611. In addition, the synthesis unit 108 includes a horizontal high-pass filter 612, a horizontal low-pass filter 613, a buffer 614, a data transfer control unit 615, a basis function ROM 616, and a filter coefficient reading unit 617.

The component separation unit 107 is connected to the switch unit 601 via the data reading unit 600. The switch unit 601 is connected to each of the upsampler 602, the upsampler 603, the upsampler 604, and the upsampler 605. The upsamplers 602 and 603 are connected to the vertical high-pass filter 606 and the vertical low-pass filter 607, respectively. The upsamplers 604 and 605 are connected to the vertical high-pass filter 608 and the vertical low-pass filter 609, respectively. The vertical high-pass filter 606 and the vertical low-pass filter 607 are each connected to the upsampler 610. The vertical high-pass filter 608 and the vertical low-pass filter 609 are each connected to the upsampler 611. The upsamplers 610 and 611 are connected to the horizontal high-pass filter 612 and the horizontal low-pass filter 613, respectively. The horizontal high-pass filter 612 and the horizontal low-pass filter 613 are each connected to the buffer 614.

The buffer 614 is connected to each of the first signal processing unit 109, the second signal processing unit 110, and the data transfer control unit 615. The data transfer control unit 615 is connected to the switch unit 601. The basis function ROM 616 is connected to the filter coefficient reading unit 617. The filter coefficient reading unit 617 is connected to each of the vertical high-pass filters 606 and 608, the vertical low-pass filters 607 and 609, the upsamplers 610 and 611, the horizontal high-pass filter 612, and the horizontal low-pass filter 613.

A filter coefficient used for an inverse wavelet transform based on the Haar function, the Daubechies function, or the like is recorded in the basis function ROM 616. In this embodiment, the Haar basis function is used in correspondence with the decomposition unit 105.

The filter coefficient reading unit 617 reads the filter coefficients from the basis function ROM 616, and transfers the high-pass filter coefficient to each of the vertical high-pass filter 606, the vertical high-pass filter 608, and the horizontal high-pass filter 612. Further, the filter coefficient reading unit 617 transfers the low-pass filter coefficient to each of the vertical low-pass filter 607, the vertical low-pass filter 609, and the horizontal low-pass filter 613. The filter coefficients transferred to each of the high-pass filters and each of the low-pass filters are set.

The synthesis unit 108 reads the low-frequency component from the decomposition unit 105 via the buffer 106, and reads from the component separation unit 107 the first component $U_k^{i(L)}$ and the second component $V_k^{i(L)}$ included in each of the high-frequency components $H_k^i$ (Hhv"i, Hh"i, and Hv"i).

Based on the first component $U_k^{i(L)}$ included in the low-frequency component and each of the high-frequency components, the synthesis unit 108 generates the first components U (=Ur, Ub, and Ug) of the original image signal F. Further, based on the second component $V_k^{i(L)}$ included in each of the high-frequency components, the synthesis unit 108 generates the second components V (=Vr, Vb, and Vg) of the original image signal F.

In this embodiment, description is made of a case of generating the first components U of the original image signal F by representing the first components included in each of the high-frequency components as Hhv"i, Hh"i, and Hv"i and representing the low-frequency component as LLi. It should be noted that upon synthesis of the second components V, LLi is set to 0. In other words, for the synthesis of the second components V, only the high-frequency components are used. The first components U and the synthesized second components V that are included in the original image signal F, are transferred to the first signal processing unit 109 and the second signal processing unit 110, respectively.

The switch unit 601 transfers the high-frequency component Hhv"i via the upsampler 602 to the vertical high-pass filter 606, and transfers the high-frequency component Hh"i via the upsampler 603 to the vertical low-pass filter 607. Further, the switch unit 601 transfers the high-frequency component Hv"i via the upsampler 604 to the vertical high-pass filter 608, and transfers the low-frequency component LLi via the upsampler 605 to the vertical low-pass filter 609. Each of the filters 606 through 609 executes the filtering processing in the vertical direction.

Further, each of the frequency components from the vertical high-pass filter 606 and the vertical low-pass filter 607 is transferred via the upsampler 610 to the horizontal high-pass filter 612. Each of the frequency components from the vertical high-pass filter 608 and the vertical low-pass filter 609 is transferred via the upsampler 611 to the horizontal low-pass filter 613. Each of the filters 612 and 613 performs the filtering processing in the horizontal direction. The frequency components from the horizontal high-pass filter 612 and the horizontal low-pass filter 613 are transferred to the buffer 614 and synthesized into one to thereby generate a low-frequency component LL"i−1 that has been subjected to the correction processing.

Here, the upsampler 602, the upsampler 603, the upsampler 604, and the upsampler 605 upsamples the input frequency component into twice in the vertical direction. The upsampler 610 and the upsampler 611 upsample the input frequency component into twice in the horizontal direction.

The data transfer control unit 615 reads the low-frequency component LL"i−1 from the buffer 614, and transfers the read low-frequency component LL"i−1 to the switch unit 601.

Further, the data reading unit 600 reads three kinds of high-frequency components Hhv"i−1, Hh"i−1, and Hv"i−1 that have been subjected to the correction processing from the component separation unit 107, and transfers the high-frequency components Hhv"i−1, Hh"i−1, and Hv"i−1 (which are decomposed into the first and second components) to the switch unit 601.

After that, the same filtering processing as described above is performed on the frequency components at the (i−1)th stage of the decomposition, and a low-frequency component LL"i−2 is output to the buffer 614. Such a process is repeated until the synthesis at the predetermined stage number I has been performed. Therefore, a low-frequency component LL"0 that has been subjected to the correction processing is finally output to the buffer 614.

If the low-frequency component LL"0 is generated based on the low-frequency component and the first components included in the high-frequency component, the low-frequency component LL"0 corresponds to the first component U of the original image signal F. If the low-frequency component LL"0 is generated based on the second components included in the high-frequency component, the low-frequency component LL"0 corresponds to the second component V of the original image signal F.

It should be noted that in this embodiment, the noise reduction processings based on the multi-stage coring processing and the soft thresholding are performed at the first noise reduction unit 307 and the second noise reduction unit 310, but this invention is not limited thereto, and the noise reduction processing may be substituted with another predetermined noise reduction processing. For example, an adaptive smoothing processing may be performed by a linear filter/nonlinear filter processing (median filter, bilateral filter, or nonlinear diffusion filter) or a shrinkage processing based on other various transform functions.

Further, in this embodiment, the second noise reduction unit 310 performs the soft thresholding on the wavelet coefficient to determine the second component V on a band signal basis, but may determine the second component corresponding to the original image signal F directly by the soft thresholding in an original space. In other words, the second noise reduction unit 310 may perform the inverse wavelet transform on the second difference component and the first component of each band signal determined as in this embodiment, and calculate the first component U and the second difference component in relation to the original image signal F to perform the soft thresholding on the second difference component in relation to the original image signal. Further, the second noise reduction unit 310 may set a third difference signal in relation to the original image signal, which is obtained by subtracting the second difference signal obtained after being subjected to the soft thresholding and the first component U of the original image signal from the original image signal F, as the second component V of the original image signal.

Further, the second noise reduction unit 310 may perform another wavelet transform on the second component of the original image signal and calculate the second component of the band signal to thereby perform the repetition processing on the above-mentioned multi-stage coring processing in a wavelet domain and the soft thresholding in the original space.

Next, description is made of effects of the first embodiment.

The decomposition unit 105 generates a plurality of band signals by decomposing the original image signal into a plurality of frequency bands. The component separation unit 107 separates the band signal into the first component (skeleton component) representing the global structure and the second component (one component other than the skeleton component) representing the local structure. In the component separation unit 107, the first correction unit including the first noise reduction unit 307 uses the band signal and the second component to perform the first correction processing for correcting the first component. In the component separation unit 107, the second correction unit including the second noise reduction unit 310 and the third difference calculation unit 311 uses the band signal and the corrected first component to perform the second correction processing for correcting the second component.

Such a combination of the first correction processing and the second correction processing is used to correct the first component by using the second component and correct the second component by using the first component, which makes it possible to speedily calculate the first component and the second component with high accuracy. The system controller 100 (control unit) controls the operation of repeating the first correction processing and the second correction processing. By repeating the first correction processing and the second correction processing, the first correction unit uses the corrected second component obtained through the second correction processing to perform the first correction processing. Accordingly, it is possible to calculate the first component and the second component with successive approximation and higher accuracy.

Further, the first difference value ($S1_k^{i(l)}$) obtained by subtracting the second component from the band signal is used to perform the first correction processing, which makes it possible to preferably determine the first component based on a remainder obtained by subtracting the second component from the band signal. The second difference value ($S2_k^{i(l)}$) obtained by subtracting the corrected first component from the band signal is used to perform the second correction processing, which makes it possible to preferably determine the second component based on a remainder obtained by subtracting the first component from the band signal.

The second correction unit calculates an index value ($S2_k^i$ $_{(l)}'$) obtained by comparing the second difference value ($S2_k^i$ $_{(l)}$) with the predetermined threshold value (Th), and sets the third difference value ($S3_k^{i(l)}$) obtained by subtracting the index value from the second difference value as the corrected second component. Accordingly, through the coring processing for obtaining the index value, the second component as an optimal solution to the variation problem for the component separation can be speedily determined with successive approximation and higher accuracy.

The extraction unit (constituted by, for example, the first transfer control unit 308) extracts the first component (skeleton component) for each band signal, and the first correction unit corrects for each band signal the first component extracted for each band signal. The units are configured to subject not the original image signal but each band signal to the component separation for the first component, and hence it is possible to use, for example, the coring processing on a band signal basis, and to speedily perform the component separation for the first component with high accuracy. In addition, the multi-resolution synthesis unit 108 synthesizes the first components corrected for each band signal across the plurality of frequency bands to thereby generate a component representing the global structure of the original image signal constituted by the band signals. Accordingly, it is possible to generate the component representing the global structure of the original image signal with high accuracy.

The second correction unit uses the first component corrected for each band signal to correct the second component for each band signal. The units are configured to subject not the original image signal but each band signal to the component separation for the second component, and hence it is possible to use, for example, the coring processing or the like for each band signal, and to speedily perform the component separation for the second component with high accuracy. The multi-resolution synthesis unit 108 synthesizes the second components corrected for each band signal across the plurality of frequency bands to thereby generate a component representing the local structure of the original image signal constituted by the band signals. Accordingly, it is possible to generate the component representing the local structure of the original image signal with high accuracy.

The decomposition unit 105 generates a plurality of band signals for each of the color signals, and therefore can handle a color original image signal. The first correction unit sets the plurality of coring ranges with respect to the first difference value obtained by subtracting the second component from the band signal. Further, the first correction unit sets the result of performing the coring processing on the first difference value based on the plurality of coring ranges, as the corrected first component (skeleton component). Accordingly, the first correction unit can correct the first component in consideration of the color difference/color sum for the color original image signal by the multi-stage coring processing, which makes it possible to determine the first component with high accuracy.

The second correction unit sets the single coring range with respect to the second difference value obtained by subtracting the corrected first component from the band signal. Further, the second correction unit corrects the second component according to the result of performing the single-stage coring processing on the second difference value based on the single coring range. Accordingly, the second correction unit can correct the second component by the coring processing, which makes it possible to determine the second component with high accuracy and at high speed.

The first correction unit corrects the first component so as to cause the corrected first component to include the flat component and the edge component, which allows the first component to be separated from the band signal as the component representing the global structure.

Modified Example of the First Embodiment

The above description has been made on the premise that the processing is performed by hardware, but this invention is not limited to such a configuration. For example, the original image signal from the image sensor 102 is recorded into a recording medium such as a memory card as raw data that is unprocessed. In addition, additional information such as imaging conditions (for example, imaging conditions including an ISO sensitivity) is recorded in the recording medium as header information of the raw data. Then, a computer may be caused to execute an image processing program that is software provided separately and to read the information recorded in the recording medium for the processing thereof. It should be noted that transmission of various information from an imaging unit to the computer may be performed not only via the recording medium but also via a communication line or the like. The image processing program is stored in a computer-readable storage medium (semiconductor memory, CD-ROM, or the like).

Figure 9:
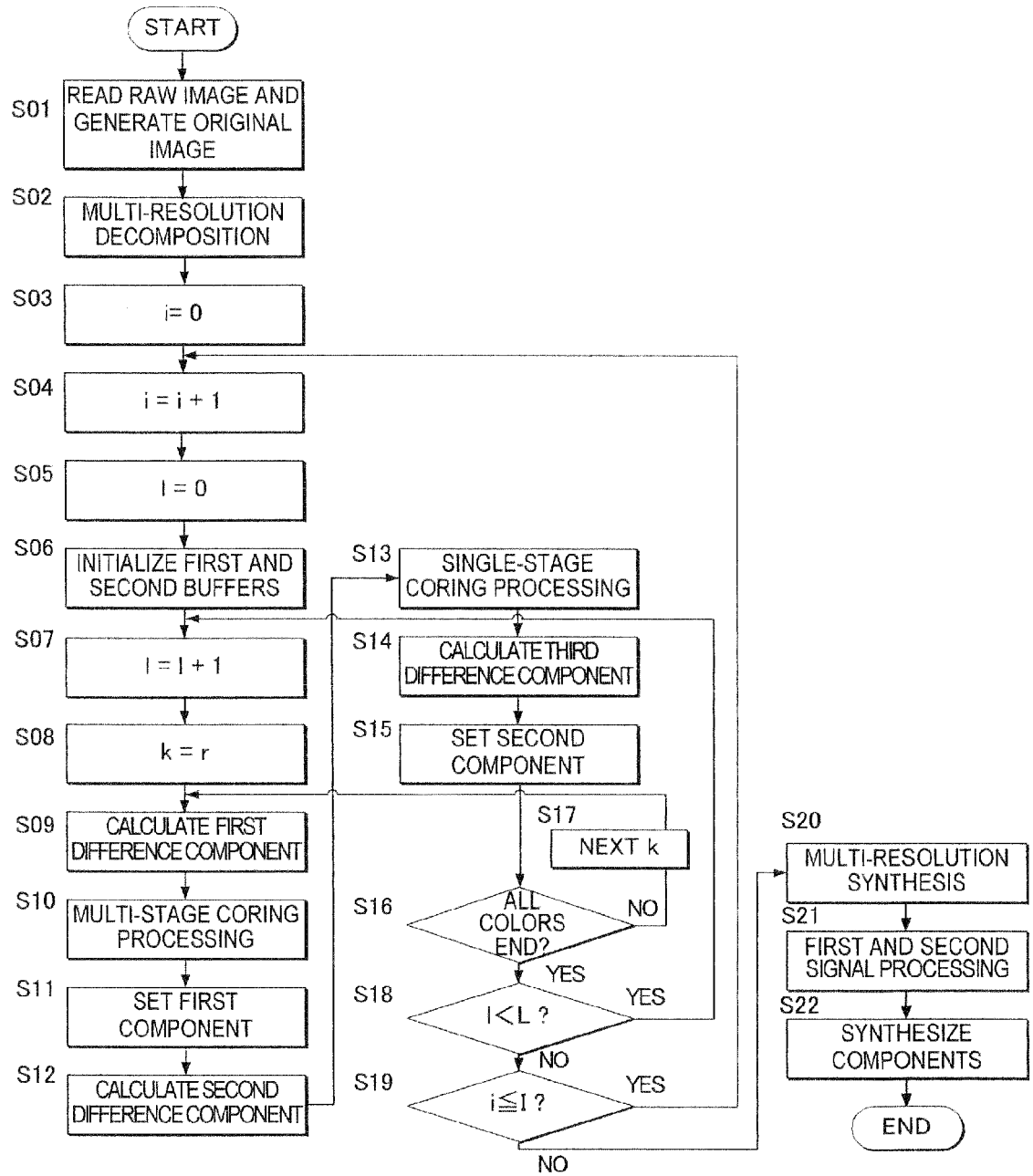
FIG. 9 is a flowchart of a processing according to a modified example of the first embodiment.

By referring to FIG. 9, description is made of a main routine of a processing performed based on the image processing program (component extraction/correction program).

First, a raw image and the header information thereon including an exposure condition and an image processing condition are read, and the original image signal F constituted by the color signals in three colors is generated by a predetermined interpolation processing based on the raw image (Step S01). Subsequently, the original image signal F is subjected to multi-resolution decomposition with the predetermined number I of stages to acquire the high-frequency component and the low-frequency component (Step S02).

Subsequently, the variable i representing the stage number of the decomposition is initialized to 0 (Step S03). Then, the stage number i of the decomposition is incremented by 1 (Step S04). Then, the variable l representing the repetition count of the repetition processing is initialized to 0 (Step S05).

Subsequently, initialization is performed on the first buffer for retaining the first component and the second buffer for retaining the second component (Step S06). Then, the repetition count l is incremented by 1 (Step S07). Then, the variable k (R signal if k=r, G signal if k=g, and B signal if k=b) representing the color signals is set to r to set the color signal to be processed (Step S08).

Subsequently, the first difference component is calculated based on Equation (12) (Step S09). Then, the first difference component calculated in Step S09 is subjected to the multi-stage coring processing based on Equations (15) and (16) (Step S10).

Subsequently, by overwriting the first buffer with a result of Step S10, the first component is updated to set the value of $U_k^{i(l)}$ (Step S11).

Subsequently, the second difference component is calculated based on Equation (13) (Step S12). Then, the second difference component calculated in Step S12 is subjected to the single-stage coring processing (soft thresholding) based on Equation (17) (Step S13). Then, the third difference component is calculated based on Equation (14) (Step S14). Then, by overwriting the second buffer with a result of Step S14, the second component is updated to set the value of $V_k^{i(l)}$ (Step S15).

Subsequently, k is referenced to judge whether or not the processing has been performed on all of the color signals R, G, and B (Step S16). If the processing has not been performed on all of the color signals R, G, and B, in Step S17, the variable k representing the color signal is updated to the subsequent value (g or b), and the routine returns to Step S09 to repeat the processing. If the processing has been performed on all of the color signals R, G, and B, the routine advances to Step S18.

Subsequently, l is referenced to judge the repetition count. When l reaches the predetermined repetition count L that is set in advance, the routine advances to Step S19. If l is less than L, the routine returns to Step S07 to repeat the processing (Step S18).

Subsequently, i is referenced, and when i reaches the predetermined multi-resolution level I that is set in advance, the routine advances to Step S20. If i is equal to or less than I, the routine returns to Step S04 to repeat the processing (Step S19).

Subsequently, the multi-resolution synthesis processing with the I stages is performed by using the first component included in the low-frequency component and the high-frequency component, and the second component included in the high-frequency component. Thereby, the first components U (=Ur, Ub, and Ug) and the second components V (=Vr, Vb, and Vg) of the original image signal are generated (Step S20).

Subsequently, a predetermined signal processing is performed on each of the first component U and the second component V (Step S21). Then, a component synthesis processing is performed in order to synthesize the first component U' and the second component V' obtained by the signal processing (Step S22). After a known compression processing or the like is finally performed, the outputting is performed, and a series of processings is brought to an end.

The modified example of the first embodiment also produces the above-mentioned effects of the first embodiment, but is advantageous in that the component extraction/correction processing can be easily performed without requiring special hardware.

Second Embodiment

Figure 10:
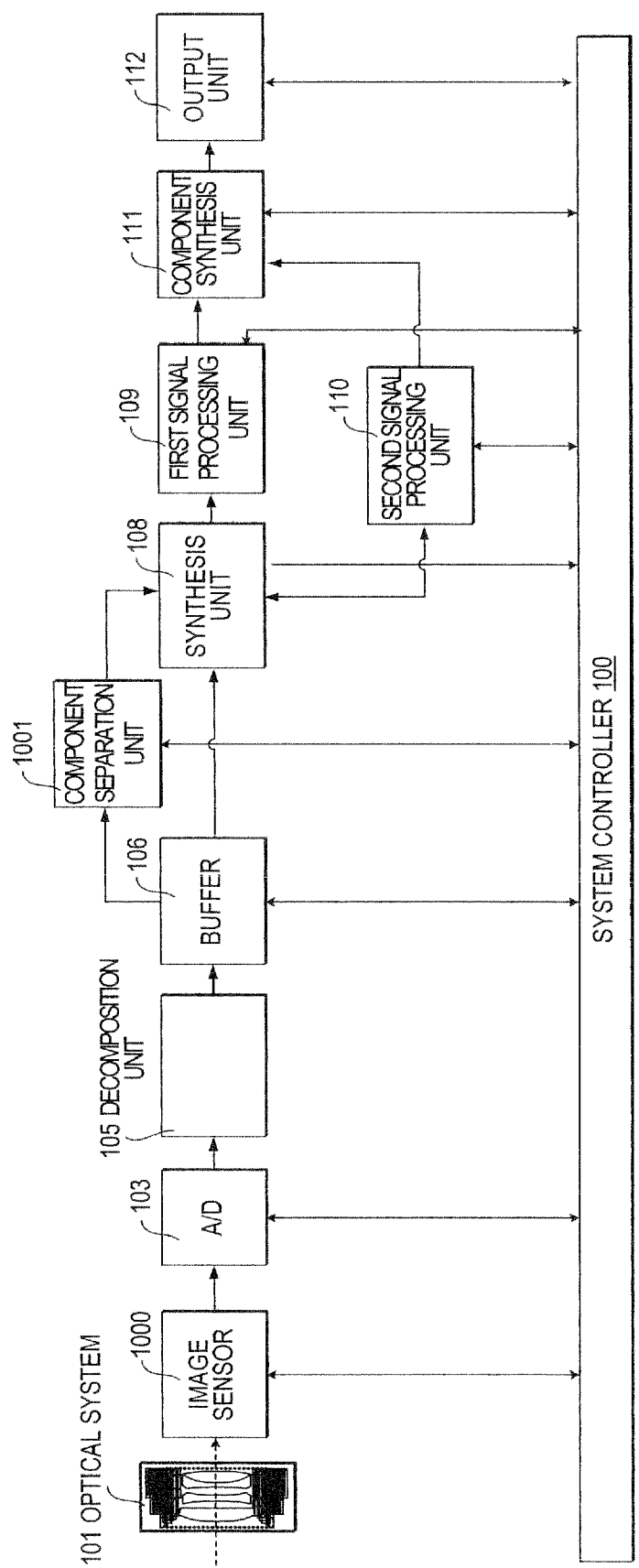
FIG. 10 is a schematic configuration diagram of an imaging electronic equipment equipped with a component extraction/correction device according to a second embodiment.

FIG. 10 is referenced to describe a component extraction/correction device according to a second embodiment of this invention. The component extraction/correction device according to the second embodiment, unlike the first embodiment, has a configuration suitable for the original image signal in monochrome (single color or black and white). It should be noted that the same components as those in the first embodiment are denoted by the same reference numerals, and components different from those in the first embodiment are mainly described.

The second embodiment is described by assuming that the component extraction/correction device according to the second embodiment is mounted to the imaging apparatus (imaging electronic equipment) such as a digital camera or a digital video camera. However, this invention is not limited thereto and can be applied to any other kind of imaging apparatus.

The imaging apparatus includes a system controller 100, an optical system 101, an image sensor 1000, an A/D converter 103 (hereinafter, referred to simply as "A/D"), and a multi-resolution decomposition unit 105 (hereinafter, may be referred to simply as "decomposition unit"). The imaging apparatus further includes a buffer 106, a component separation unit 1001, a multi-resolution synthesis unit 108 (hereinafter, may be referred to simply as "synthesis unit"), a first signal processing unit 109, a second signal processing unit 110, a component synthesis unit 111, and an output unit 112. Each of the above-mentioned components may be configured by a logic circuit, or may be configured by a central processing unit (CPU) and a memory or the like storing a computing program. The component extraction/correction device of this embodiment includes the decomposition unit 105 and the component separation unit 1001.

The image sensor 1000 is connected to the decomposition unit 105 via the A/D 103. The decomposition unit 105 is connected to the component separation unit 1001 via the buffer 106. The component separation unit 1001 is connected to the synthesis unit 108. The synthesis unit 108 is connected to the first signal processing unit 109, and also connected to the component synthesis unit 111 via the second signal processing unit 110. The component synthesis unit 111 is connected to the output unit 112. Each of the processing units is connected to the system controller 100, and has an operation thereof controlled by the system controller 100.

In this embodiment, the image sensor 1000 is a monochrome image sensor. On the basis of the control of the system controller 100, the image sensor 1000 outputs an optical image formed on, a surface of the image sensor 1000 via the optical system 101 as an analog image signal. The analog image signal is transferred to the A/D 103. The A/D 103 converts the analog image signal into a digital signal, which is then transferred to the decomposition unit 105.

By the same processing as that in the first embodiment, the decomposition unit 105 subjects the original image signal F in monochrome (single color or black and white) to the multi-resolution decomposition with the predetermined number I of stages. The decomposition unit 105 generates a high-frequency component and a low-frequency component at the i-th stage of the decomposition, and records the high-frequency component and the low-frequency component into the buffer 106. Here, I represents an integer equal to or larger than 1, and i represents an integer equal to or larger than 1 and equal to or smaller than I.

The component separation unit 1001 decomposes each high-frequency component into a first component and a second component included in each high-frequency component. The component separation unit 1001 repeatedly applies a decomposition algorithm constituted by the single-stage coring processing (soft thresholding) and the difference calculation processing to the high-frequency component. In the second embodiment, the multi-stage coring processing performed in the first embodiment is replaced with the single-stage coring processing (soft thresholding) having the single coring range. The first component and the second component obtained after a predetermined repetition count are transferred to the synthesis unit 108. Details of the component decomposition processing are described later.

The subsequent processings are the same as those in the first embodiment except that the color signal is replaced with a monochrome signal in single color or black and white as the processing subject. In other words, the multi-resolution synthesis processing at the synthesis unit 108 is performed in the same manner as in the first embodiment. The signal processing for the first component at the first signal processing unit 109 and the signal processing for the second component at the second signal processing unit 110 are also performed in the same manner as in the first embodiment. The synthesis processing at the component synthesis unit 111 and the processing at the output unit 112 are also performed in the same manner as in the first embodiment.

(Component Separation Unit 1001)

Figure 11:
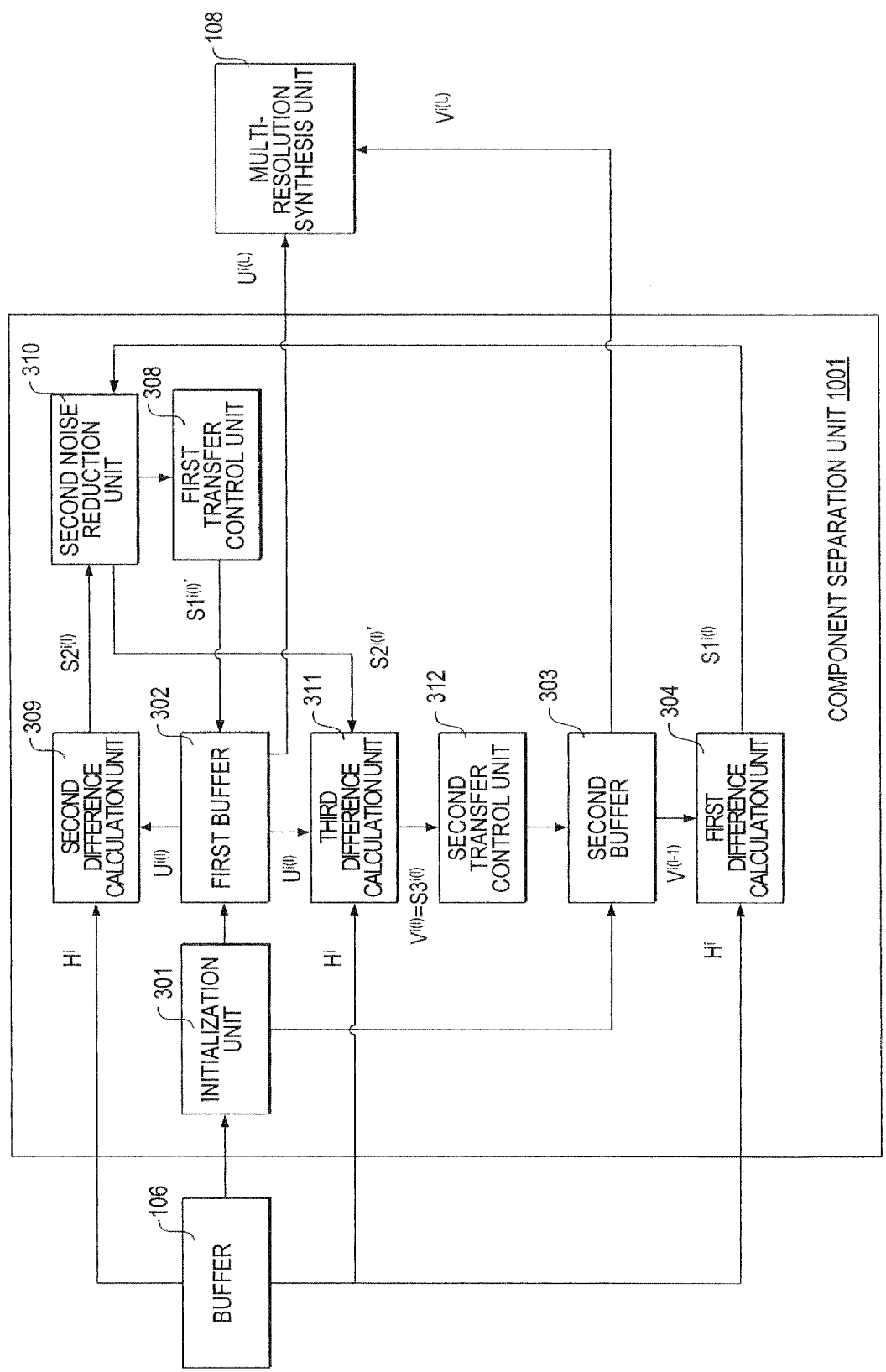
FIG. 11 is a schematic configuration diagram of a component separation unit according to the second embodiment.

Next, FIG. 11 is referenced to describe an operation of the component separation unit 1001 in detail.

The component separation unit 1001 includes an initialization unit 301, a first buffer 302, a second buffer 303, a first difference calculation unit 304, and a first transfer control unit 308. Further, the component separation unit 1001 includes a second difference calculation unit 309, a second noise reduction unit 310, a third difference calculation unit 311, and a second transfer control unit 312.

The buffer 106 is connected to the initialization unit 301, the first difference calculation unit 304, the second difference calculation unit 309, and the third difference calculation unit 311. The initialization unit 301 is connected to the first buffer 302 and the second buffer 303. The second buffer 303 is connected to the first difference calculation unit 304 and the synthesis unit 108. The first difference calculation unit 304 is connected to the second noise reduction unit 310. The second noise reduction unit 310 is connected to the first transfer control unit 308.

The first transfer control unit 308 is connected to the first buffer 302. The first buffer 302 is connected to the second difference calculation unit 309, the third difference calculation unit 311, and the synthesis unit 108. The second difference calculation unit 309 is connected to the second noise reduction unit 310. The second noise reduction unit 310 is connected to the third difference calculation unit 311. The third difference calculation unit 311 is connected to the second transfer control unit 312. The second transfer control unit 312 is connected to the second buffer 303.

The component separation unit 1001 acquires the high-frequency components from the buffer 106, and decomposes each of the high-frequency components into the first component and the second component. In the same manner as in the first embodiment, the decomposition precision is optimized by the repetition of the difference calculation processing and the noise reduction processing based on the coring.

In the first embodiment, the multi-stage coring processing is performed at the first noise reduction unit 307. Meanwhile, in the second embodiment, the multi-stage coring processing at the first noise reduction unit 307 is replaced with the single-stage coring processing (soft thresholding) performed at the second noise reduction unit 310. This is because the original image signal F is monochrome in the second embodiment. Therefore, in the second embodiment, the second noise reduction unit 310 corresponds to the first correction unit for correcting/updating a first component $U^{i(l)}$.

Hereinbelow, as an example thereof, description is made of a case where the first component $U^{i(l)}$ and a second component $V^{i(l)}$ are separated from the high-frequency component $H^i$ related to the original image signal F. Here, a superscript i (i=0 through I) represents the stage number of the multi-resolution decomposition, and a superscript l (l=0 through L) represents the repetition count.

First in the repetition with l=0, only an initialization processing is performed on the first buffer 302 retaining the first component and the second buffer 303 retaining the second component. The initialization unit 301 acquires high-frequency component $H^i$ of the original image signal F from the buffer 106. The initialization unit 301 transfers the acquired high-frequency component $H^i$ to the first buffer 302, and records the high-frequency component $H^i$ into the first buffer 302. Simultaneously, the initialization unit 301 controls the second buffer to have all of values therein cleared to zero.

Next, a processing at the l-th time (l≠0) is performed. First, the first difference calculation unit 304 acquires the high-frequency component $H^i$ of the original image signal F from the buffer 106 and a second component $V^{i(l-1)}$ from the second buffer 303, and calculates a first difference component $S1^{i(l)}$ (first difference value) based on Equation (18).

$$S1^{i(l)} = H^i - V^{i(l-1)} \quad (18)$$

It should be noted that if l=1, $V^{i(l-1)}=V^{i(0)}=0$. The calculated first difference component $S1^{i(l)}$ is transferred to the second noise reduction unit 310.

The second noise reduction unit 310 subjects the first difference component $S1^{i(l)}$ to the single-stage coring processing (soft thresholding) based on Equation (17). The first transfer control unit 308 controls a first difference component $S1^{i(l)\prime}$ obtained by the coring processing to be transferred to the first buffer 302. By overwriting a first component $U^{i(l-1)}$ recorded in the first buffer 302 with the first difference component $S^{i(l)\prime}$ as the first component $U^{i(l)}$, the first component is corrected/updated ($U^{i(l)}=S1^{i(l)\prime}$). It should be noted that if l=1, $U^{i(l-1)}=U^{i(0)}=H^i$.

Subsequently, the second difference calculation unit 309 acquires the high-frequency component $H^i$ from the buffer 106 and the first component $U^{i(l)}$ from the first buffer 302, and calculates a second difference component $S2^{i(l)}$ (second difference value) based on Equation (19).

$$S2^{i(l)} = H^i - U^{i(l)} \quad (19)$$

The calculated second difference component $S2^{i(l)}$ (n is transferred to the second noise reduction unit 310. The second noise reduction unit 310 subjects the second difference component $S2^{i(l)}$ (n to the single-stage coring processing (soft thresholding) based on Equation (17).

Subsequently, the third difference calculation unit 311 acquires the high-frequency component $H^i$ from the buffer 106, the first component $U^{i(l)}$ from the first buffer 302, and the second difference component $S2^{i(l)\prime}$ obtained by the coring processing from the second noise reduction unit 310. The third difference calculation unit 311 calculates a third difference component $S3^{i(l)}$ (third difference value) based on Equation (20).

$$S3^{i(l)} = H^i - U^{i(l)} - S2^{i(l)\prime} \quad (20)$$

The third difference component $S3^{i(l)}$ corresponds to a noise portion removed from the second difference component $S2^{i(l)}$ by the second noise reduction unit 310 performing the coring processing. The second transfer control unit 312 controls the third difference component $S3^{i(l)}$ calculated by the third difference calculation unit 311 to be transferred to the second buffer 303. By overwriting the second component $V^{i(l-1)}$ recorded in the second buffer 303 with the third difference component $S3^{i(l)}$ as the second component $V^{i(l)}$, the second component is corrected/updated ($V^{i(l)}=S3^{i(l)}$). It should be noted that if l=1, $V^{i(l-1)}=V^{i(0)}=0$.

As described above, in the repetition at the l-th time, the high-frequency component $H^i$ is decomposed into the first component $U^{i(l)}$ and the second component $V^{i(l)}$. When the repetition count reaches L, the first component $U^{i(L)}$ and the second component $V^{i(L)}$ retained in the first buffer 302 and the second buffer 303, respectively, are set as final outputs and transferred to the synthesis unit 108.

The second embodiment also produces the same effects as in the first embodiment. However, the configuration according to the second embodiment is suitable for the original image signal in monochrome, and the multi-stage coring processing is replaced with the general single-stage coring processing having the single coring range. Accordingly, in comparison with the first embodiment, the configuration of the component separation unit can be further simplified.

Modified Example of the Second Embodiment

The above description has been made on the premise that the processing is performed by hardware, but this invention is not limited to such a configuration. For example, the original image signal from the image sensor 1000 is recorded into a recording medium such as a memory card with the original image signal being unprocessed. In addition, additional information such as imaging conditions (for example, imaging conditions including an ISO sensitivity) is recorded in the recording medium as header information. Then, a computer may be caused to execute an image processing program that is software provided separately and to read the information recorded in the recording medium for the processing thereof. It should be noted that transmission of various information from an imaging unit to the computer may be performed not only via the recording medium but also via a communication line or the like. The image processing program is stored in a computer-readable storage medium (semiconductor memory, CD-ROM, or the like).

Figure 12:
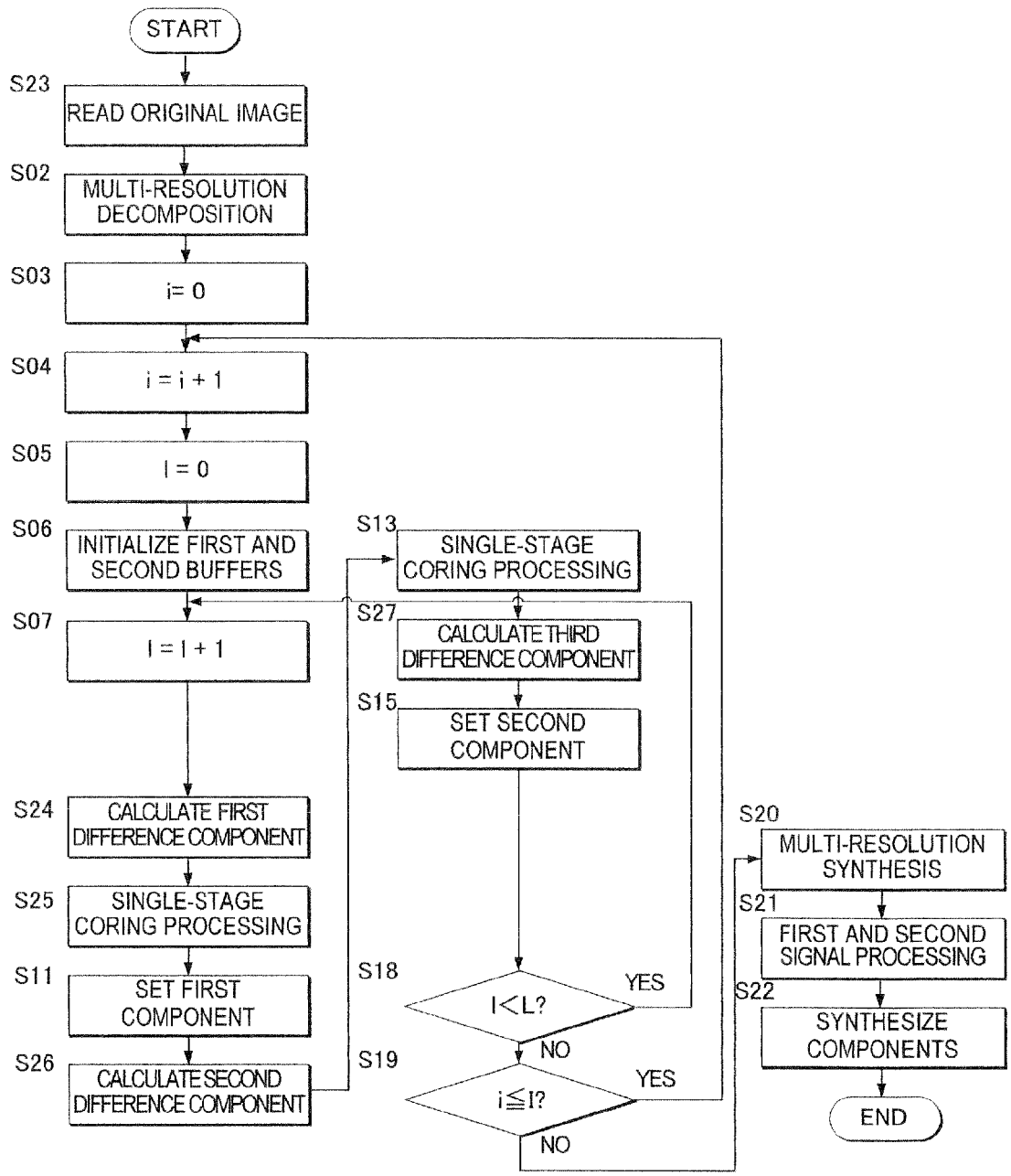
FIG. 12 is a flowchart of a processing according to a modified example of the second embodiment.

By referring to FIG. 12, description is made of a main routine of a processing performed based on the image processing program (component extraction/correction program).

First, the original image signal F and the header information thereon including an exposure condition and an image processing condition are read (Step S23). Subsequently, the original image signal is subjected to multi-resolution decomposition with the predetermined stage number I to acquire the high-frequency component and the low-frequency component (Step S02).

Subsequently, the variable i representing the stage number of the decomposition is initialized to 0 (Step S03). Then, the stage number i of the decomposition is incremented by 1 (Step S04). Then, the variable l representing the repetition count of the repetition processing is initialized to 0 (Step S05). Subsequently, initialization is performed on the first buffer for retaining the first component and the second buffer for retaining the second component (Step S06). Then, the repetition count l is incremented by 1 (Step S07).

Subsequently, the first difference component $S1^{i(l)}$ is calculated based on Equation (18) (Step S24). Then, the first difference component $S1^{i(l)}$ calculated in Step S24 is subjected to the single-stage coring processing (soft thresholding) having the single coring range based on Equation (17) (Step S25). Then, by overwriting the first buffer with a result $S1^{i(l)\prime}$ of Step S25, the first component is updated (Step S11).

Subsequently, the second difference component $S2^{i(l)}$ is calculated based on Equation (19) (Step S26). Then, the second difference component $S2^{i(l)}$ calculated in Step S26 is subjected to the single-stage coring processing (soft thresholding) having the single coring range based on Equation (17) (Step S13).

Subsequently, the third difference component $S3^{i(l)}$ is calculated based on Equation (20) (Step S27). Then, by overwriting the second buffer with a result $S3^{i(I)}$ of Step S27, the second component is updated (Step S15).

Subsequently, l is referenced to judge the repetition count. When l reaches the predetermined repetition count L that is set in advance, the routine advances to Step S19. If l is less than L, the routine returns to Step S07 to repeat the processing (Step S18).

Subsequently, i is referenced, and when i reaches the predetermined multi-resolution level I that is set in advance, the routine advances to Step S20. If i is equal to or less than I, the routine returns to Step S04 to repeat the processing (Step S19).

Subsequently, the multi-resolution synthesis processing with the predetermined number I of stages is performed by using the first component included in the low-frequency component and the high-frequency component, and the second component included in the high-frequency component. Then, the first component U and the second component V of the original image signal F are generated (Step S20). Subsequently, a predetermined signal processing is performed on each of the first component U and the second component V (Step S21).

Then, a synthesis processing is performed for the first component U' and the second component V' obtained by the signal processing (Step S22). After a known compression processing or the like is finally performed, the outputting is performed, and a series of processings is brought to an end.

The modified example of the second embodiment also produces the effects of the second embodiment, but is advantageous in that the component extraction/correction processing can be easily performed without requiring special hardware.

Third Embodiment

Figure 14:
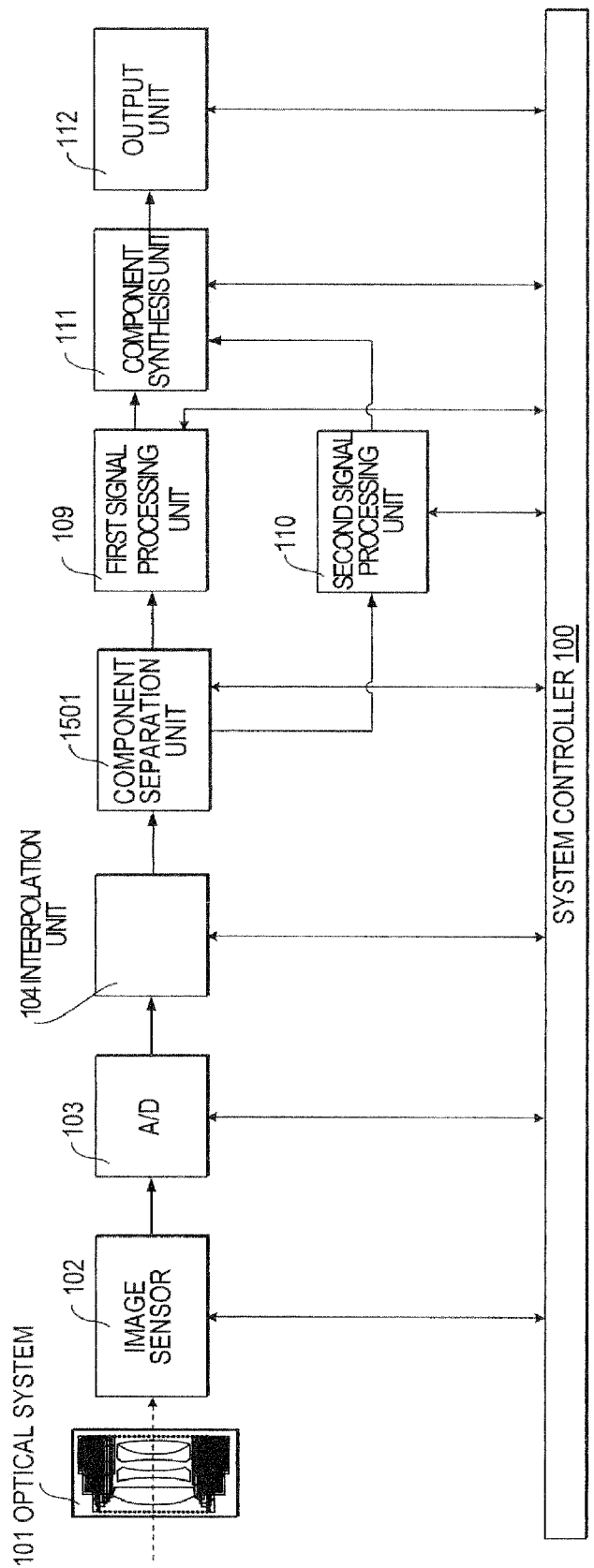
FIG. 14 is a schematic configuration diagram of an imaging electronic equipment equipped with a component extraction/correction device according to a third embodiment.

FIG. 14 is referenced to describe a component extraction/correction device according to a third embodiment of this invention. It should be noted that, in the component extraction/correction device according to the third embodiment, the same components as those in the first embodiment are denoted by the same reference numerals, and components different from those in the first embodiment are mainly described.

The third embodiment is described by assuming that the component extraction/correction device according to the third embodiment is mounted to the imaging apparatus (imaging electronic equipment) such as a digital camera or a digital video camera. However, this invention is not limited thereto and can be applied to any other kind of imaging apparatus.

The imaging apparatus includes a system controller 100 (control unit), an optical system 101, an image sensor 102, an A/D 103, an interpolation unit 104, a component separation unit 1501, a first signal processing unit 109, a second signal processing unit 110, a component synthesis unit 111, and an output unit 112. Each of the above-mentioned components may be configured by a logic circuit, or may be configured by a central processing unit (CPU) and a memory or the like storing a computing program. The component extraction/correction device of this embodiment includes the component separation unit 1501.

The image sensor 102 is connected to the interpolation unit 104 via the A/D 103. The interpolation unit 104 is connected to the component separation unit 1501. The component separation unit 1501 is connected to the first signal processing unit 109, and also connected to the component synthesis unit 111 via the second signal processing unit 110. The component synthesis unit 111 is connected to the output unit 112. Each of the processing units is connected to the system controller 100, and has an operation thereof controlled by the system controller 100.

On the basis of the control of the system controller 100, the image sensor 102 outputs an optical image formed on a surface of the image sensor 102 via the optical system 101 as an analog image signal.

The analog image signal is transferred to the A/D 103. The A/D 103 converts the analog image signal into a digital signal, which is then transferred to the interpolation unit 104.

The interpolation unit 104 subjects the digital signal to a predetermined demosaicing processing to generate a color three-plate image signal (hereinafter, referred to as "original image signal F"). In this embodiment, the original image signal F is constituted by color signals of red (R), green (G), and blue (B). Hereinafter, the color signals of red (R), green (G), and blue (B) are referred to as Fr, Fg, and Fb, respectively. The original image signal F is transferred to the component separation unit 1501.

The component separation unit 1501 decomposes the original image signal F into a first component and a second component. In the first embodiment, each of the high-frequency components generated by the multi-resolution decomposition processing is subjected to the first correction processing by the first noise reduction unit 307 to generate the first component and subjected to the second correction processing by the second noise reduction unit 310 and the third difference calculation unit 311 to generate the second component, after which the respective components are synthesized across the respective frequency bands to thereby generate the first component and the second component of the original image signal F.

In this embodiment, each of the high-frequency components generated by the multi-resolution decomposition processing is subjected to the multi-stage coring processing by the first noise reduction unit 307 to generate the first components of the respective high-frequency components. The first components thus generated are synthesized across the respective frequency bands to thereby generate the first component of the original image signal, and then the difference signal between the original image signal and the first component of the original image signal is calculated. By subjecting the calculated difference signal to the soft thresholding by the second noise reduction unit 310, the second component of the original image signal is generated. The component separation are described later. The generated first component U is transferred to the first signal processing unit 109, and the second component V is transferred to the second signal processing unit 110.

The first signal processing unit 109 reads the first component U of the original image signal F from the component separation unit 1501, and performs a predetermined signal processing. In this embodiment, the first signal processing unit 109 performs a gradation conversion on the first component U of the original image signal F. A first component U' obtained after being subjected to the gradation conversion is transferred to the component synthesis unit 111. The first signal processing unit 109 may perform another gradation conversion such as a γ correction.

The second signal processing unit 110 reads the second component V from the component separation unit 1501, and performs a predetermined signal processing. In this embodiment, the second signal processing unit 110 performs on the second component V a noise reduction processing and a sharpening processing based on gain multiplication. A second component V' obtained after being processed is transferred to the component synthesis unit 111.

The component synthesis unit 111 synthesizes the first component U' that has been processed by the first signal processing unit 109 and the second component V' that has been processed by the second signal processing unit 110 at a predetermined ratio, and a synthesis component F' is obtained. The predetermined ratio is a ratio of, for example, 1:1. The synthesis component F' is transferred to the output unit 112, and is recorded into a recording medium constituted by a flash memory or the like.

Figure 15:
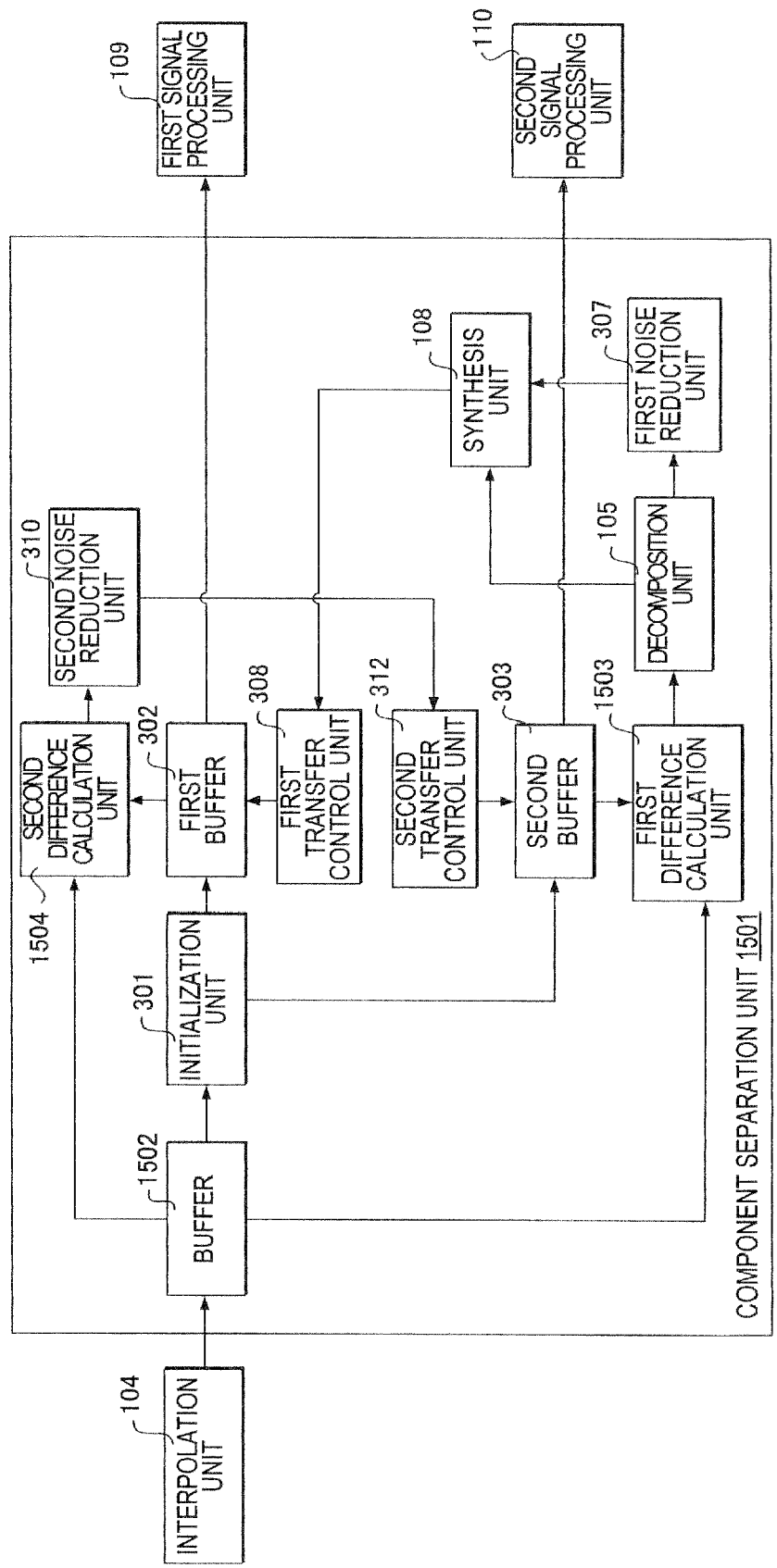
FIG. 15 is a schematic configuration diagram of a component separation unit according to the third embodiment.

Next, FIG. 15 is referenced to describe an operation of the component separation unit 1501 in detail.

The component separation unit 1501 includes a buffer 1502, an initialization unit 301, a first buffer 302, a second buffer 303, a first difference calculation unit 1503, a multi-resolution decomposition unit 105, a first noise reduction unit 307, a multi-resolution synthesis unit 108, a first transfer control unit 308, a second difference calculation unit 1504, a second noise reduction unit 310, and a second transfer control unit 312.

The interpolation unit 104 is connected to the buffer 1502. The buffer 1502 is connected to the initialization unit 301, the first difference calculation unit 1503, and the second difference calculation unit 1504. The initialization unit 301 is connected to the first buffer 302 (first storage unit) and the second buffer 303 (second storage unit).

The second buffer 303 is connected to the first difference calculation unit 1503 and the second signal processing unit 110. The first difference calculation unit 1503 is connected to the multi-resolution decomposition unit 105. The multi-resolution decomposition unit 105 is connected to the first noise reduction unit 307 and the multi-resolution synthesis unit 108. The first noise reduction unit 307 is connected to the multi-resolution synthesis unit 108. The multi-resolution synthesis unit 108 is connected to the first transfer control unit 308. The first transfer control unit 308 is connected to the first buffer 302. The first buffer 302 is connected to the second difference calculation unit 1504, and the first signal processing unit 109.

The second difference calculation unit 1504 is connected to the second noise reduction unit 310. The second noise reduction unit 310 is connected to the second transfer control unit 312. The second transfer control unit 312 is connected to the second buffer 303.

The component separation unit 1501 acquires the original image signal corresponding to each of the color signals from the interpolation unit 104, and decomposes the original image signal into the first component and the second component. The decomposition is performed by repeatedly performing a predetermined noise reduction processing and a predetermined difference calculation processing. The system controller 100 serving as the control unit controls the repetition of operations for the noise reduction processing and the difference calculation processing.

In this embodiment, the buffer 1502 represents a buffer memory for retaining the original image signal, the first buffer 302 represents a buffer memory for retaining the first component, and the second buffer 303 represents a buffer memory for retaining the second component.

Each time the noise reduction processing and the difference calculation processing are repeated, the first component and the second component retained in the first buffer 302 and the second buffer 303, respectively, are updated to improve the decomposition precision, which leads to optimization. When a predetermined repetition count L is reached, the first component ($U_k^{(L)}$ described later) and the second component ($V_k^{(L)}$ described later) recorded in the first buffer 302 and the second buffer 303, respectively, are transferred to the first signal processing unit 109 and the second signal processing unit 110, respectively.

It should be noted that in this embodiment, the first difference calculation unit 1503 constitutes the extraction unit of the component extraction/correction device, but this invention is not limited thereto. For example, the initialization unit 301 and the first difference calculation unit 1503 function as the extraction unit for the initial multi-stage coring processing. In this embodiment, the extraction unit extracts the first component (skeleton component) before being corrected from the original image signal. In other words, the extraction unit obtains the difference component by subtracting the second component from the original image signal.

Further, in this embodiment, the first noise reduction unit 307 constitutes the first correction unit for performing the first correction processing of correcting the first component (skeleton component). Further, the second noise reduction unit 310 constitutes the second correction unit for performing the second correction processing of correcting the one component (second component) other than the skeleton component. However, in the first embodiment, the second noise reduction unit 310 performs the processing on the band signal (high-frequency component) based on the multi-resolution decomposition, while in this embodiment, the second noise reduction unit 310 performs the processing on the difference component obtained by subtracting the first component of the original image signal from the original image signal.

Hereinbelow, as an example thereof, description is made of a case of separating the color signal $F_k$ into the first component $U_k^{(l)}$ and the second component $V_k^{(l)}$. Here, the subscript k (=r, g, and b) is a symbol representing a color. The R signal is represented by k=r, the G signal is represented by k=g, and the B signal is represented by k=b. The superscript l (l=0 through L) represents the repetition count. Further, the color signal $F_k$ generated by the interpolation unit 104 is recorded in the buffer 1502 in advance.

First in the repetition with l=0, an initialization processing is performed on the first buffer 302 retaining the first component and the second buffer 303 retaining the second component. The initialization unit 301 acquires the color signals Fr, Fg, and Fb from the buffer 1502, and records the color signals Fr, Fg, and Fb into the first buffer 302. Simultaneously, the initialization unit 301 controls the second buffer to have all of values therein cleared to zero.

Such an initialization processing allows the first component and the second component to be calculated appropriately. It should be noted that if l=0, the initialization unit 301 and the first difference calculation unit 1503 function as the extraction unit for extracting the first component (skeleton component) from among the plurality of components constituting the band signal.

Next, description is made of a component extraction/correction processing performed at the l-th time (l≠0). The processing is not independently performed on each of the color signals. In one repetition processing (for example, processing at the l-th time), the processing for all of the color signals (k=r, g, and b) is performed once, and after that, the subsequent repetition processing (processing at the (l+1)st time) is performed.

First, the first difference calculation unit 1503 acquires the color signal $F_k$ from the buffer 1502 and a second component $V^{k(l-1)}$ from the second buffer 303, and calculates a first difference component $S1_k^{(l)}$ (first difference value) based on Equation (21)

$$S1_k^{(l)} = F_k - V_k^{(l-1)} \quad (21)$$

The calculated first difference component $S1_k^{(l)}$ is transferred to the multi-resolution decomposition unit 105. The multi-resolution decomposition unit 105 decomposes $S1_k^{(l)}$ into a plurality of frequency bands in the same manner as in the first embodiment. Of the frequency components of the first difference component obtained by the decomposition, the high-frequency component $S1_k^{i(l)}$ is transferred to the first noise reduction unit 307, and the low-frequency component (direct current component) is transferred to the multi-resolution synthesis unit 108. Here, the superscript i (i=0 through I) represents the stage number of the multi-resolution decomposition.

By the same method as that of the first embodiment, the first noise reduction unit 307 subjects the high-frequency component $S1_k^{i(l)}$ of the first difference component to the multi-stage coring processing having the plurality of coring ranges in consideration of the color sum and the color difference among the color signals. The high-frequency component $S1_k^{i(l)'}$ of the first difference component obtained after being subjected to the multi-stage coring processing is transferred to the multi-resolution synthesis unit 108. The multi-stage coring processing is performed on the high-frequency component $S1_k^{i(l)}$ at every stage i (i=0 through I). By the same method as that of the first embodiment, the multi-resolution synthesis unit 108 performs the multi-resolution synthesis processing based on the low-frequency component (direct current component) of the first difference component and the high-frequency component $S1_k^{i(l)'}$ obtained after being subjected to the multi-stage coring processing, which are received from the multi-resolution decomposition unit 105 and the first noise reduction unit 307, respectively. The first transfer control unit 308 controls the synthesized components to overwrite the first component $U_k^{(l-1)}$ recorded in the first buffer 302, as the first component $U_k^{(l)}$, to thereby correct/update the first component.

Subsequently, the second difference calculation unit 1504 acquires the original image signal $F_k$ from the buffer 1502 and the first component $U_k^{(l)}$ from the first buffer 302, and calculates a second difference component $S2_k^{(l)}$ (second difference value) based on Equation (22).

$$S2_k^{(l)} = F_k - U_k^{(l)} \quad (22)$$

The calculated second difference component $S2_k^{(l)}$ is transferred to the second noise reduction unit 310.

By the same method as that of the first embodiment, the second noise reduction unit 310 subjects the second difference component $S2_k^{(l)}$ to the general single-stage coring processing (soft thresholding) having one coring range. However, unlike in the first embodiment, the signal to be subjected to the coring is the difference signal between the original image signal F and the first component U in the original space. Hence, the single-stage coring processing may be performed on each of pixels whose number is the same as the number of pixels of the original image signal F. The second transfer control unit 312 controls the second difference component $S2_k^{(l)'}$ obtained by being subjected to the single-stage coring processing to be transferred to the second buffer 303. By overwriting a second component $V_k^{(l-1)}$ recorded in the second buffer 303 with the difference component as the second component $V_k^{(l)}$, the second component is corrected/updated ($V_k^{(l)} = S2_k^{(l)'}$).

The above-mentioned processing is effected on each of the color signals (k=r, g, and b). The repetition processing at the l-th time is completed at a time point when the processing for all of the color signals is completed.

When the repetition count reaches L, the first component $U_k^{(L)}$ and the second component $V_k^{(L)}$ retained in the first buffer 302 and the second buffer 303, respectively, are set as final outputs and transferred to the first signal processing unit 109 and the second signal processing unit 110.

It should be noted that in this embodiment, the repetition count is preset to the predetermined count L, but may be set variable according to the decomposition precision. For example, the repetition processing may be configured to stop if an absolute value of a difference between the first component $U_k^{i(l)}$ at the l-th time and the first component $U_k^{i(l-1)}$ at the (l−1)st time or an absolute value of a difference between the second component $V_k^{(l)}$ at the l-th time and the second component $V_k^{(l-1)}$ at the (l−1)st time becomes equal to or smaller than a predetermined threshold value. Therefore, the repetition processing is stopped if there is substantially no change of the first component or the second component due to the repetition.

It should be noted that the repetition processing is performed in this embodiment, but only the processing at the l=1st time may be performed without performing the repetition processing, which is performed after the initialization processing at the l=0th time.

The third embodiment also produces the same effects as those in the first embodiment. However, the correction processing for the first component (multi-stage coring processing performed by the first noise reduction unit 307) according to the third embodiment is the processing with respect to each of the high-frequency components of the first difference component ($S1_k^{i(l)}$) based on the multi-resolution decomposition. The correction processing for the second component (soft thresholding performed by the second noise reduction unit 310) is the processing with respect to the second difference component ($S2_k^{(l)}$). The correction processing for the second component is the processing performed not within a multi-resolution transform domain but within a spatial domain. In comparison with the first embodiment, it is possible to suppress a buffer size of the second buffer 303 for recording the second component (in the first embodiment, the buffer size of the second buffer 303 for recording the second component of the band signal increases according to the stage number I of the multi-resolution decomposition).

It should be noted that in this embodiment, similarly to the first embodiment, the noise reduction processings based on the multi-stage coring processing and the soft thresholding are performed at the first noise reduction unit 307 and the second noise reduction unit 310, but this invention is not limited thereto, and the noise reduction processing may be substituted with another predetermined noise reduction processing. For example, the adaptive smoothing processing may be performed by the linear filter/nonlinear filter processing (median filter, bilateral filter, or nonlinear diffusion filter) or the shrinkage processing based on other various transform functions.

For example, by replacing the multi-stage coring processing performed by the first noise reduction unit 307 with the soft thresholding performed by the second noise reduction unit 310 (in other words, by performing the soft thresholding on the first and second difference components at the second noise reduction unit 310), it is possible to simplify a processing configuration.

It should be noted that in this embodiment, the orthogonal wavelet transform using the Haar basis is performed, but as in the first embodiment, all of wavelet bases including a biorthogonal wavelet basis can be applied. Further, it is possible to apply a redundant wavelet transform (such as a stationary wavelet transform) of a type that avoids subsampling (so that the value of wavelet coefficients at each level becomes the same as the number of input pixels).

Modified Example of the Third Embodiment

The above description has been made on the premise that the processing is performed by hardware, but this invention is not limited to such a configuration. For example, the original image signal from the image sensor 102 is recorded into a recording medium such as a memory card as raw data that is unprocessed. In addition, additional information such as imaging conditions (for example, imaging conditions including an ISO sensitivity) is recorded in the recording medium as header information of the raw data. Then, a computer may be caused to execute an image processing program that is software provided separately and to read the information recorded in the recording medium for the processing thereof. It should be noted that transmission of various information from an imaging unit to the computer may be performed not only via the recording medium but also via a communication line or the like. The image processing program is stored in a computer-readable storage medium (semiconductor memory, CD-ROM, or the like).

Figure 16:
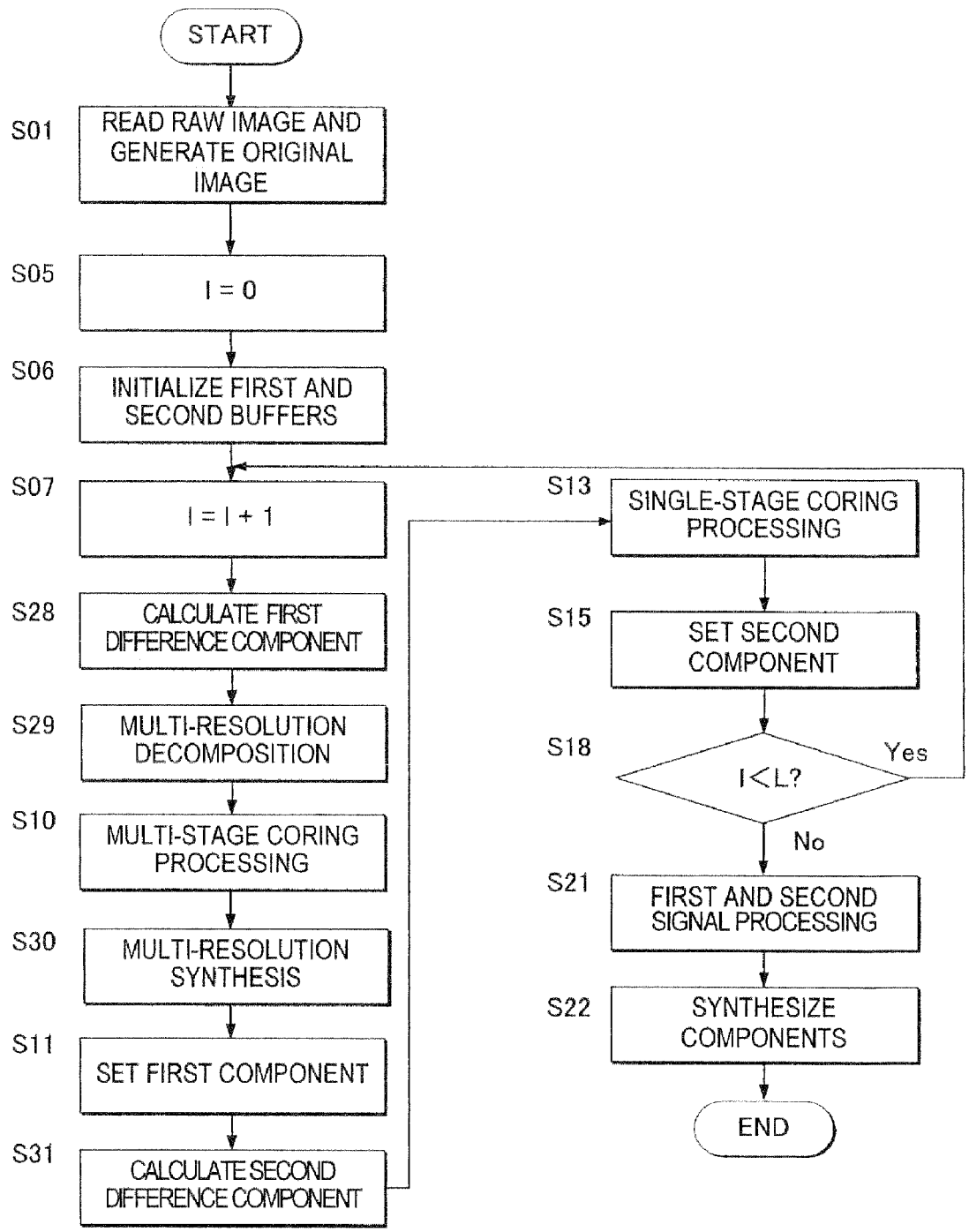
FIG. 16 is a flowchart of a processing according to a modified example of the third embodiment.

By referring to FIG. 16, description is made of a main routine of a processing performed based on the image processing program (component extraction/correction program).

First, a raw image and the header information thereon including an exposure condition and an image processing condition are read, and the original image signal F constituted by the color signals in three colors is generated by a predetermined interpolation processing based on the raw image (Step S01).

Then, the variable l representing the repetition count of the repetition processing is initialized to 0 (Step S05). Subsequently, initialization is performed on the first buffer for retaining the first component and the second buffer for retaining the second component (Step S06). Then, the repetition count l is incremented by 1 (Step S07).

Subsequently, the first difference component is calculated based on Equation (21) (Step S28). Then, the first difference component is subjected to the multi-resolution decomposition with the stage number I of the decomposition to acquire the high-frequency component and the low-frequency component (Step S29). Then, the multi-stage coring processing is performed on the high-frequency component calculated in Step S29 (Step S10).

Subsequently, by using the low-frequency component of the first difference component and the high-frequency component obtained after being subjected to the multi-stage coring processing, the multi-resolution synthesis with the number I of stages is performed to generate the first component U of the original image signal (Step S30). Then, by overwriting the first buffer with a result of Step S30, the first component is updated to set the value of $U_k^{(l)}$ (Step S11).

Subsequently, the second difference component is calculated based on Equation (22) (Step S31). Then, the second difference component calculated in Step S31 is subjected to the single-stage coring processing (soft thresholding) (Step S13). Then, by overwriting the second buffer with a calculation result of Step S13, the second component is updated to set the value of $V_k^{(l)}$ (Step S15).

Subsequently, l is referenced to judge the repetition count. When l reaches the predetermined repetition count L that is set in advance, the routine advances to Step S21. If l is less than L, the routine returns to Step S07 to repeat the processing (Step S18).

Subsequently, a predetermined signal processing is performed on each of the first component U and the second component V (Step S21). Then, a component synthesis processing is performed in order to synthesize the first component U' and the second component V' obtained by the signal processing (Step S22). After a known compression processing or the like is finally performed, the outputting is performed, and a series of processings is brought to an end.

The modified example of the third embodiment also produces the effects similar to those of the third embodiment, but is advantageous in that the component extraction/correction processing can be easily performed without requiring special hardware.

This invention is not limited to the above-mentioned embodiments, and it is apparent that various changes can be made within the scope of technical ideas thereof.

The present application claims priority from Japanese Patent Application No. 2008-196814 filed with the Japan Patent Office on Jul. 30, 2008, the content of all of which is hereby incorporated by reference into this application.

What is claimed is:

1. A component extraction/correction device, comprising:
    a decomposition unit that decomposes an original image signal into a plurality of frequency bands to generate a plurality of band signals;
    an extraction unit that extracts a skeleton component representing a global structure of the band signal from among a plurality of components constituting the band signal;
    a first correction unit that performs a first correction processing to correct the extracted skeleton component by using the band signal and one component other than the skeleton component among the plurality of components; and
    a second correction unit that performs a second correction processing to correct the one component by using the corrected skeleton component and the band signal.

2. The component extraction/correction device according to claim 1, wherein the one component comprises a component representing a local structure of the band signal.

3. The component extraction/correction device according to claim 1, wherein the first correction unit performs the first correction processing by using a first difference value obtained by subtracting the one component from the band signal.

4. The component extraction/correction device according to claim 1, wherein the second correction unit performs the second correction processing by using a second difference value obtained by subtracting the corrected skeleton component from the band signal.

5. The component extraction/correction device according to claim 4, wherein the second correction unit calculates an index value obtained by comparing the second difference value with a predetermined threshold value, and sets a third difference value obtained by subtracting the index value from the second difference value, as the corrected one component.

6. The component extraction/correction device according to claim 1, wherein:
    the decomposition unit generates the plurality of band signals for each color;
    the extraction unit extracts the skeleton component for each color by using the band signal generated for each color;

the first correction unit corrects the extracted skeleton component as the first correction processing by using the band signal generated for each color, and the second correction unit corrects the one component for each color as the second correction processing by using the corrected skeleton component.

7. The component extraction/correction device according to claim 1, further comprising a control unit that controls repetition of operations for the first correction processing performed by the first correction unit and the second correction processing performed by the second correction unit, wherein the first correction unit performs, when the first correction processing is repeated by the control unit, the first correction processing by using the corrected one component obtained by the second correction processing.

8. The component extraction/correction device according to claim 1, wherein:

the extraction unit extracts the skeleton component representing the global structure for each band signal;

the first correction unit corrects for each band signal the skeleton component extracted for each band signal; and the component extraction/correction device further comprises a synthesis unit that synthesizes the skeleton component corrected for each band signal across the plurality of frequency bands to thereby generate the skeleton component representing the global structure of the original image signal constituted by the plurality of band signals.

9. The component extraction/correction device according to claim 1, wherein:

the extraction unit extracts the skeleton component representing the global structure for each band signal;

the first correction unit corrects for each band signal the skeleton component extracted for each band signal;

the second correction unit corrects the one component for each band signal by using the skeleton component corrected for each band signal; and the component extraction/correction device further comprises a synthesis unit that synthesizes the one component corrected for each band signal across the plurality of frequency bands to thereby generate a component representing a local structure of the original image signal constituted by the plurality of band signals.

10. The component extraction/correction device according to claim 1, further comprising:

a first storage unit that stores the skeleton component corrected by the first correction unit;

a second storage unit that stores the one component corrected by the second correction unit; and an initialization unit that sets, before the first correction processing at a first time, the skeleton component stored by the first storage unit to zero while setting the one component stored by the second storage unit to the band signal.

11. The component extraction/correction device according to claim 1, wherein the first correction unit is configured to:

set a plurality of coring ranges for a first difference value obtained by subtracting the one component from the band signal; and set a result of performing a coring processing on the first difference value based on the plurality of coring ranges, as the corrected skeleton component.

12. The component extraction/correction device according to claim 11, wherein the first correction unit is configured to:

transform, if the first difference value belongs to any one of the plurality of coring ranges, the first difference value into a fixed value corresponding to the coring range concerned; and transform, if the first difference value belongs to none of the plurality of coring ranges, the first difference value based on a transform function.

13. The component extraction/correction device according to claim 1, wherein the second correction unit is configured to:

set a single coring range for a second difference value obtained by subtracting the corrected skeleton component from the band signal; and correct the one component according to a result of performing a coring processing on the second difference value based on the single coring range.

14. The component extraction/correction device according to claim 13, wherein the second correction unit is configured to:

transform, if the second difference value belongs to the single coring range, the second difference value into a predetermined fixed value; and transform, if the second difference value does not belong to the single coring range, the second difference value based on a transform function.

15. The component extraction/correction device according to claim 1, wherein the decomposition unit decomposes the original image signal into the plurality of frequency bands by a wavelet transform.

16. The component extraction/correction device according to claim 1, wherein the first correction unit corrects the skeleton component to thereby cause the corrected skeleton component to include a flat component and an edge component.

17. A component extraction/correction device, comprising:

an extraction unit that extracts a skeleton component representing a global structure of an original image signal;

a decomposition unit that decomposes the extracted skeleton component into a plurality of frequency bands to generate the skeleton component for each of a plurality of band signals;

a first correction unit that performs a first correction processing to correct the skeleton component for each band signal;

a synthesis unit that synthesizes the skeleton component corrected for each band signal across the plurality of frequency bands to thereby generate the skeleton component of the original image signal constituted by the plurality of band signals; and a second correction unit that performs a second correction processing to correct one component other than the skeleton component of the original image signal by using the original image signal and the skeleton component of the original image signal.

18. The component extraction/correction device according to claim 17, further comprising:

a control unit that controls repetition of operations for an extraction processing performed by the extraction unit, a decomposition processing performed by the decomposition unit, the first correction processing performed by the first correction unit, a synthesis processing performed by the synthesis unit, and the second correction processing performed by the second correction unit, wherein the extraction unit performs, if the extraction processing performed by the extraction unit is repeated by the control unit, the extraction processing by using the one component obtained by the second correction unit and the original image signal.

19. The component extraction/correction device according to claim 17, wherein the extraction unit extracts the skeleton component of the original image signal by using a difference value obtained by subtracting the one component from the original image signal.

20. The component extraction/correction device according to claim 17, wherein the one component comprises a component representing a local structure of the original image signal.

21. The component extraction/correction device according to claim 17, wherein the decomposition unit decomposes the original image signal into the plurality of frequency bands by a wavelet transform.

22. The component extraction/correction device according to claim 17, wherein the first correction unit corrects the skeleton component to thereby cause the corrected skeleton component to include a flat component and an edge component.

23. An electronic equipment, comprising the component extraction/correction device according to claim 1.

24. An electronic equipment, comprising the component extraction/correction device according to claim 17.

25. A component extraction/correction method comprising:
decomposing an original image signal into a plurality of frequency bands to generate a plurality of band signals;
extracting a skeleton component representing a global structure of the band signal from among a plurality of components constituting the band signal;
performing a first correction processing to correct the extracted skeleton component by using the band signal and one component other than the skeleton component among the plurality of components; and
performing a second correction processing to correct the one component by using the corrected skeleton component and the band signal.

26. A non-transitory computer-readable storage device having a program stored thereon that is executable by a computer, the program controlling the computer to perform functions comprising:
decomposing an original image signal into a plurality of frequency bands to generate a plurality of band signals;
extracting a skeleton component representing a global structure of the band signal from among a plurality of components constituting the band signal;
performing a first correction processing to correct the extracted skeleton component by using the band signal and one component other than the skeleton component among the plurality of components; and
performing a second correction processing to correct the one component by using the corrected skeleton component and the band signal.

27. A component extraction/correction method comprising:
extracting a skeleton component representing a global structure of an original image signal;
decomposing the extracted skeleton component into a plurality of frequency bands to generate the skeleton component for each of a plurality of band signals;
performing a first correction processing to correct the skeleton component for each band signal;
synthesizing the skeleton component corrected for each band signal across the plurality of frequency bands to thereby generate the skeleton component of the original image signal constituted by the plurality of band signals; and
performing a second correction processing to correct one component other than the skeleton component of the original image signal by using the original image signal and the skeleton component of the original image signal.

28. A non-transitory computer-readable storage device having a program stored thereon that is executable by a computer, the program controlling the computer to perform functions comprising:
extracting a skeleton component representing a global structure of an original image signal;
decomposing the extracted skeleton component into a plurality of frequency bands to generate the skeleton component for each of a plurality of band signals;
performing a first correction processing to correct the skeleton component for each band signal;
synthesizing the skeleton component corrected for each band signal across the plurality of frequency bands to thereby generate the skeleton component of the original image signal constituted by the plurality of band signals; and
performing a second correction processing to correct one component other than the skeleton component of the original image signal by using the original image signal and the skeleton component of the original image signal.

* * * * *